US008122580B2

(12) United States Patent
Potje et al.

(10) Patent No.: US 8,122,580 B2
(45) Date of Patent: Feb. 28, 2012

(54) METHODS FOR MANUFACTURING AN AXLE

(75) Inventors: Richard Gerard Potje, St. Charles, MO (US); Timothy Dunagan, Searcy, AR (US); Jon Edmond Meyer, St. Louis, MO (US); James A. Cowan, Wildwood, MO (US)

(73) Assignee: American Railcar Industries, Inc., St. Charles, MO (US)

( * ) Notice: Subject to any disclaimer, the term of this patent is extended or adjusted under 35 U.S.C. 154(b) by 731 days.

(21) Appl. No.: 12/146,776

(22) Filed: Jun. 26, 2008

(65) Prior Publication Data
US 2009/0320263 A1 Dec. 31, 2009

(51) Int. Cl.
B23P 25/00 (2006.01)
B23P 17/00 (2006.01)
B23Q 7/00 (2006.01)
C21D 8/00 (2006.01)

(52) U.S. Cl. ............ 29/430; 29/407.05; 29/557; 29/559; 29/822; 29/824; 148/581; 148/649; 148/654

(58) Field of Classification Search ............... 29/897.2, 29/407.01, 407.05, 407.09, 430, 557, 559, 29/822, 824; 148/581, 649, 654, 662, 663, 148/664

See application file for complete search history.

(56) References Cited

U.S. PATENT DOCUMENTS

| | | | |
|---|---|---|---|
| 2,256,065 A | 9/1941 | Urschel et al. | |
| 2,394,514 A * | 2/1946 | Evans et al. | 29/81.08 |
| 2,604,801 A * | 7/1952 | Cornell | 72/472 |
| 3,472,058 A * | 10/1969 | Hautau | 72/407 |
| 3,564,896 A * | 2/1971 | Clark et al. | 72/368 |
| 3,926,689 A | 12/1975 | Respen et al. | |
| 3,939,779 A | 2/1976 | Pringle | |
| 4,200,326 A | 4/1980 | Wilcox | |
| 4,380,480 A | 4/1983 | Delfino et al. | |
| 4,659,005 A | 4/1987 | Spindler | |
| 4,768,839 A | 9/1988 | Spindler | |
| 5,242,359 A | 9/1993 | Obrist | |
| 5,303,985 A | 4/1994 | Barnholt et al. | |
| 5,522,246 A | 6/1996 | Simon | |
| 5,725,253 A * | 3/1998 | Salive et al. | 283/67 |
| 6,189,456 B1 | 2/2001 | Smith et al. | |
| 6,439,672 B1 | 8/2002 | Simon | |

(Continued)

FOREIGN PATENT DOCUMENTS

CN 1369335 A * 9/2002

(Continued)

OTHER PUBLICATIONS

"Chapter 29: Production of Railroad Axles," The Making, Shaping and Treating of Steel, 9th ed., 1971, pp. 923-928, U.S. Steel Corp., Pittsburgh, Pennsylvania.

*Primary Examiner* — Jermie Cozart
(74) *Attorney, Agent, or Firm* — Armstrong Teasdale LLP

(57) ABSTRACT

A method for manufacturing an axle is provided. The method includes heating a billet at a heating station to a predetermined temperature, forging the heated billet at a forging station to form an axle, and machining the axle at a machining station to form a machined axle. A product is automatically transported to and from each station using a product transport system, wherein the product includes the billet, the axle and the machined axle.

30 Claims, 17 Drawing Sheets

U.S. PATENT DOCUMENTS

| | | | |
|---|---|---|---|
| 6,945,083 B2 * | 9/2005 | Sauerland et al. | 72/9.2 |
| 6,959,476 B2 | 11/2005 | Li et al. | |
| 7,115,176 B2 | 10/2006 | Sundgren et al. | |
| 2003/0037426 A1 | 2/2003 | Platner | |
| 2004/0060385 A1 * | 4/2004 | Prucher | 74/607 |
| 2006/0242835 A1 | 11/2006 | Fuks et al. | |

FOREIGN PATENT DOCUMENTS

SU 363912 A * 7/1974

* cited by examiner

METHODS FOR MANUFACTURING AN AXLE

BACKGROUND OF THE INVENTION

The field of the invention relates generally to methods and systems for manufacturing an axle and, more particularly, to methods and systems for manufacturing an axle for a railcar using a continuous operation that includes forging, machining, heat treating, and inspecting the axle.

The process of manufacturing an axle for a railcar generally includes several sub-processes, including heating, forging, heat treating, machining, and inspecting. At least some known axle manufacturing processes are not continuous operations. These known axle manufacturing processes are performed within different buildings and/or at different locations. In some cases, these known axle manufacturing processes are not continuous operations because the axle being produced must be given time to cool after being forged and after the heat treating process. These known processes do not include a process for continuously cooling an axle after forging while the axle moves to the next step in the manufacturing processes.

Moreover, these known axle manufacturing processes are also typically performed in different locations in a non-continuous fashion to prevent dirt and dust formed during forging and/or heat treating from interfering with machining the axle. For example, the heat produced during forging and/or heat treating an axle may adversely affect the machines used during the machining and/or inspection processes. Accordingly, at least some known manufacturing systems perform a forging process in a first building, perform a heat treating process in a second building, and perform a machining process in a third building. At least one known manufacturing system may perform forging and heat treating in the same building, however, machining is still performed in a separate building; and often times at a separate location. None of these known processes for manufacturing an axle are a continuous process, wherein the axle continuously moves from heating, to forging, to heat treating, to machining, to final inspection. Because these known manufacturing processes are performed either within different buildings or at different locations, and not in a continuous fashion, the number of axles that these known processes are capable of producing per day is limited and the cost associated with these processes is high.

As discussed above, the known axle manufacturing processes include a significant amount of time for cooling the axles between forging and heat treating and/or between heat treating and machining. At least one known cooling method includes cooling axles under a layer of dirt for two to three days before the axles are transported to the next manufacturing process. Such cooling further reduces the number of axles per day that can be manufactured by known processes. Moreover, known manufacturing processes employ a significant number of skilled people to operate machines within the manufacturing process. Manually operating the machines depending on the type of axle being produced may further slow the manufacturing time of an axle. This lack of automation in these known processes further reduces output and increases production costs.

BRIEF DESCRIPTION OF THE INVENTION

In one aspect, a method for manufacturing an axle is provided. The method includes heating a billet at a heating station to a predetermined temperature, forging the heated billet at a forging station to form an axle, and machining the axle at a machining station to form a machined axle. A product is automatically transported to and from each station using a product transport system, wherein the product includes the billet, the axle and the machined axle.

In another aspect, a method for manufacturing an axle is provided. The method includes receiving a billet at a beginning of a product transport system and entering information related to the billet into a control system at a receiving station. The information regards at least one of a heat lot, a heat code, a chemical composition, and steel mill information. The method also includes automatically cutting the billet at a cutting station to a predetermined size before heating the billet wherein the predetermined size is based on a type of axle to be manufactured from the billet, assigning a virtual tracking identifier to the billet at a marking station to automatically track the billet and any axles produced from the billet during the manufacturing process wherein the virtual tracking identifier provides the entered information regarding the billet, and heating the billet at a heating station to a predetermined temperature. The heated billet is descaled at a descaling station prior to forging the heated billet, wherein the descaling station uses a high-pressure water spray to descale the heated billet. The heated billet is forged at a forging station to form an axle, and the axle is heat treated at a heat treating station after the axle is forged at the forging station, wherein the heat treating station automatically alters a temperature of the axle to produce an axle having predetermined metallurgical properties. The axle is cooled at a post-heat treating cooling station before machining the axle to form the machined axle, wherein the axle is continuously transported through the post-heat treating cooling station by the product transport system. The method includes machining the axle at a machining station to form a machined axle, inspecting the machined axle using an inspection station, and marking the machined axle with an identification mark at an axle marking station. The identification mark provides the entered information relating to the billet and information relating to the manufacturing process used to form the machined axle. The machined axle is washed to facilitate preventing rust from forming on the machined axle, and a plurality of machined axles are automatically loaded onto at least one of a truck and a train car according to a predetermined axle shipping allocation. A product is automatically transported to and from each station using the product transport system that is controlled by the control system, wherein the product includes the billet, the axle and the machined axle.

In yet another aspect, a continuous system for automatically manufacturing an axle is provided. The system includes a plurality of sub-systems and an automated transport system. The plurality of sub-systems includes a furnace configured to heat a billet to a predetermined forging temperature, a forging system configured to forge an axle from a heated billet, and a machining system configured to form a machined axle from the axle. The automated transport system is configured to automatically transport a product to and from each of the plurality of sub-systems, wherein the product includes the billet, the axle, and the machined axle.

DETAILED DESCRIPTION OF THE INVENTION

Figure 1:
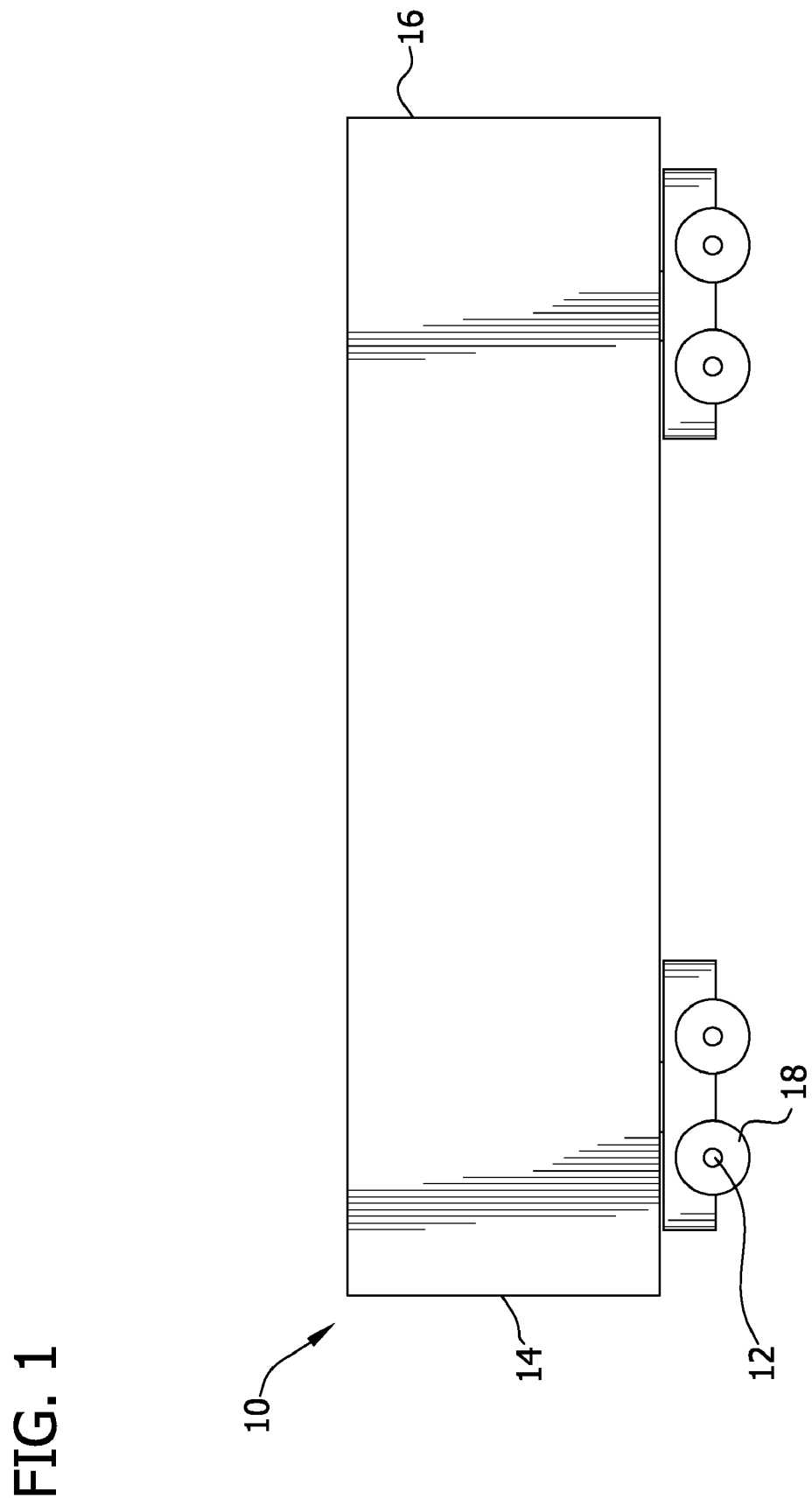
FIG. 1 is a side view of an exemplary railcar.

FIG. 1 illustrates an exemplary railcar 10. Railcar 10 includes a plurality of axles 12. More specifically, railcar 10 includes two axles 12 near a front end 14 of railcar 10 and two axles near a rear end 16 of railcar 10. Each axle 12 includes a wheel 18 coupled to each end thereof. Described herein is a method and system for manufacturing axles, such as axles 12.

Figure 2A:
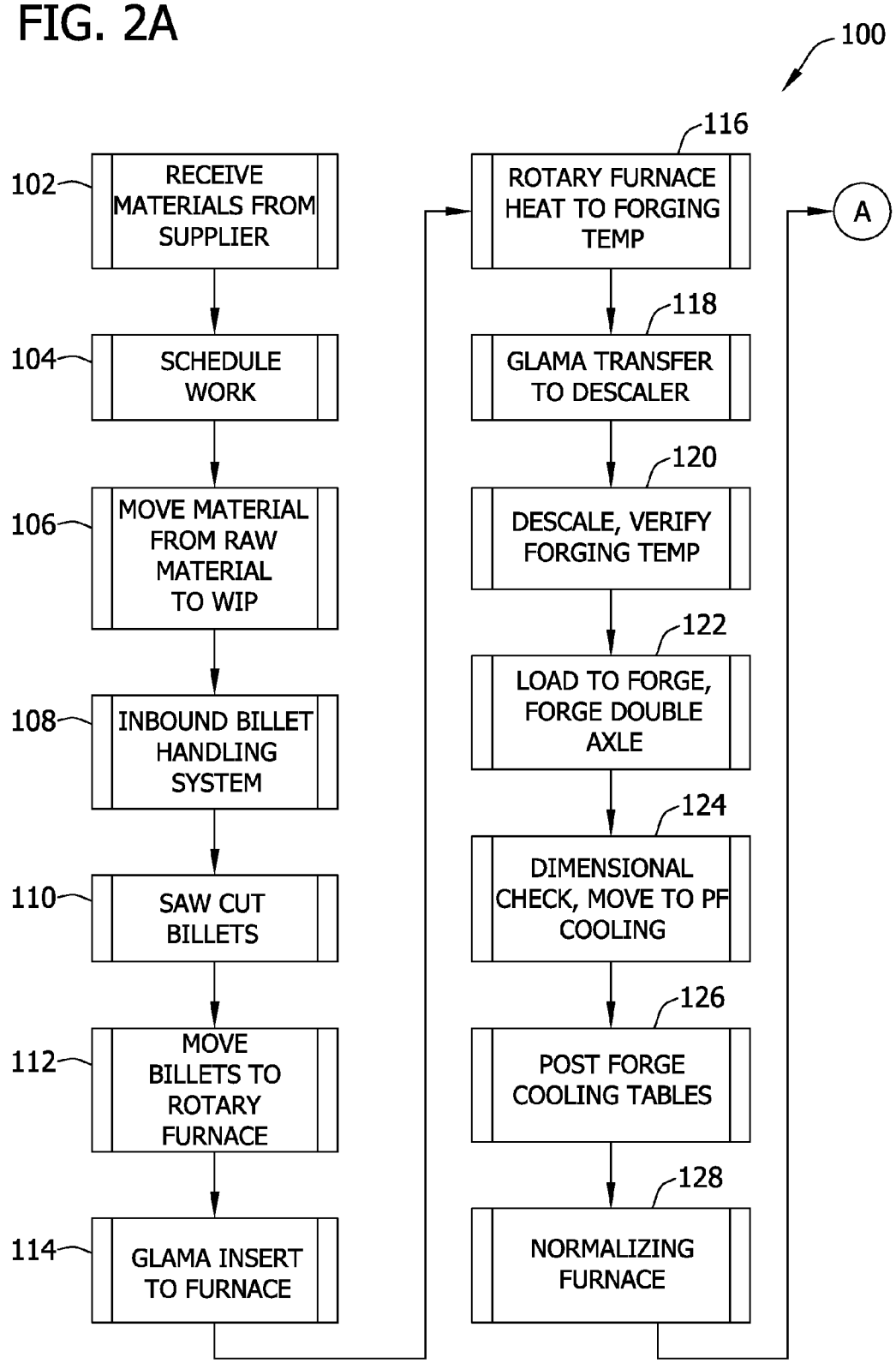
FIG. 2 is a flow chart illustrating an exemplary method for manufacturing an axle.
Figure 2B:
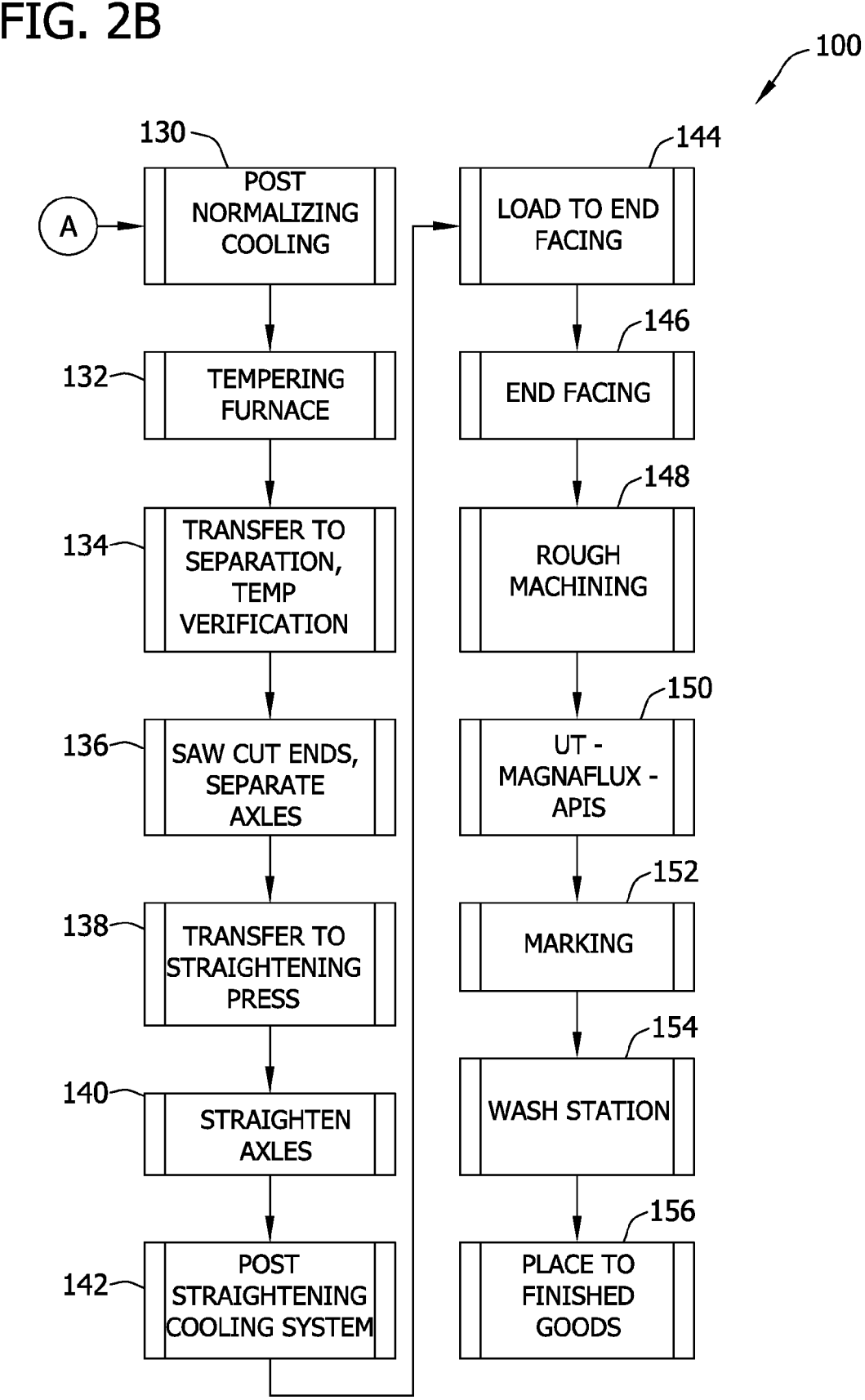

FIG. 2 is a flow chart showing an exemplary method 100 for manufacturing an axle, such as axle 12 (shown in FIG. 1). Method 100 is a continuous and automated process. Method 100 can be performed at a single location and within substantially the same building. Method 100 includes receiving 102 raw materials, such as steel, from a supplier by rail and/or truck. More specifically, in the exemplary embodiment, steel billets are received 102 and stored in a raw material storage area. During receiving 102, information about each billet is read by an automated receiving system and such information is entered into a control system. More specifically, each billet includes a code, such as a barcode, attached thereto, wherein the code includes billet information, such as heat code, heat lot, chemical composition, the supplier's name, steel mill information, and/or where the billet was made. Work is scheduled 104 by entering into the control system what type of axle a billet will be formed into and when the finished axles are needed. Other information may be entered into the control system for controlling automated forging and machining processes that form the billet into at least one finished axle.

Once the work is scheduled 104, the raw material is moved 106 in the control system from a raw material status to a work-in-progress (WIP) status. The billet is saw cut 110 automatically to a given mass for forming a particular type of axle and assigned an identification mark, such as a virtual serial number within the control system, for tracking the billet through the forging and machining processes. The raw material or billet is then conveyed 108 by an inbound billet handling system into a forging process. The identification mark allows the control system to track each billet, and later each axle, through the entire manufacturing process. More specifically, the identification mark indicates to the automated forging and machining systems what type of axle the billet is to be formed into such that the automated forging and machining systems are controlled by the control system to form the billet into the pre-selected type of axle.

The billet is automatically moved 112 from the cutting and virtual marking system to a rotary furnace. The billet is inserted 114 into a furnace by automated means, such as a robotic device. The rotary furnace heats 116 the billet to a forging temperature. The forging temperature may range from about 2100° F. to about 2200° F. In the exemplary embodiment, the forging temperature is approximately 2150° F. The heated billet is transferred 118 from the furnace by the automated means to a powered conveyor that transports the heated billet into a descaler to descale 120 the heated billet. The descaler is a high-pressure washer that removes an outer layer of slag from the heated billet, which is generated from the furnace heating. After the billet is descaled 120, a forging temperature of the billet is verified 120.

After descaling and verification 120, the descaled billet is automatically loaded 122 into a forge, and a double axle is forged 122 from the billet. Alternatively, a single axle is forged 122 from the billet. In the exemplary embodiment, the dimensions of the forged double axle are checked 124, and the double axle is moved 124 to post-forging (PF) cooling. The double axle is essentially two axles attached at one end of each axle wherein the two axles have substantially the same longitudinal centerline. As discussed below, each double axle will be later separated to form two axles. The double axle is then conveyed 126 through post-forge cooling tables to cool further. The double axle is further conveyed 128 from the post-forge cooling tables into a normalizing furnace in which the double axle undergoes a single normalizing process. The normalized double axle is cooled 130 at a post-normalizing cooling station, for example, a continuous walking beam. Before cooling 130 at the post-normalizing cooling station, the double axle may optionally be quenched, depending on the specifications for the double axle.

The cooled double axle is then tempered 132 in a tempering furnace. The tempered double axle is transferred 134 to a separation station and the temperature of the double axle is verified 134. In the separation station, the double axle is saw cut 136 to separate the double axle into two single axles. In the exemplary embodiment, saw cut 136 is made at the center of the double axle and at each end of the double axle. In the next station, the straightness of the single axles is checked, and if need, an axle is automatically transferred 138 to a straightening press in which the axle is straightened 140. The straightened axle is cooled 142 in a post-tempering cooling system. The cooled, straightened axle is loaded 144 to an end facing machine, and the ends of each axle are faced 146. More specifically, the facing machine removes material from the ends of each axle and drills a center hole in each end. The axle is then automatically rough machined 148 to correspond to the specification for the type of axle that was scheduled 104. After rough machining 148, the axle is tested 150 using, for example, an ultrasonic inspection system, a magnetic particle imaging inspection system, and an axle property inspection system (APIS). After testing 150, the axles are automatically marked 152 with a code that includes identifying information about the axle, such as the manufacturer, the heat code, the heat lot, and/or the manufacturing month and year, based on the identification mark given to the axle when it was cut 110 from a billet. The marked axle is washed 154 and, in the control system, the status of the axle is changed 156 from WIP to finished goods. The finished axle can be automatically stored and/or automatically shipped accordingly.

The above-described method is a continuous and automated process that is performed within one building. In an alternative embodiment, the method is performed within a series of buildings. More specifically, in the exemplary embodiment, raw material (e.g., a steel billet) is continuously conveyed through the automatic processes of becoming a double axle, and then single axles, without departing from a single, continuous path. Further, the material is continuously moved throughout the process and is continuously monitored by a control system such that each product can be identified at any time. As used herein, the term "product" refers to a billet and any axle formed therefrom, such as a double axle, a single, a rough axle, and/or a machined axle.

Figure 3:
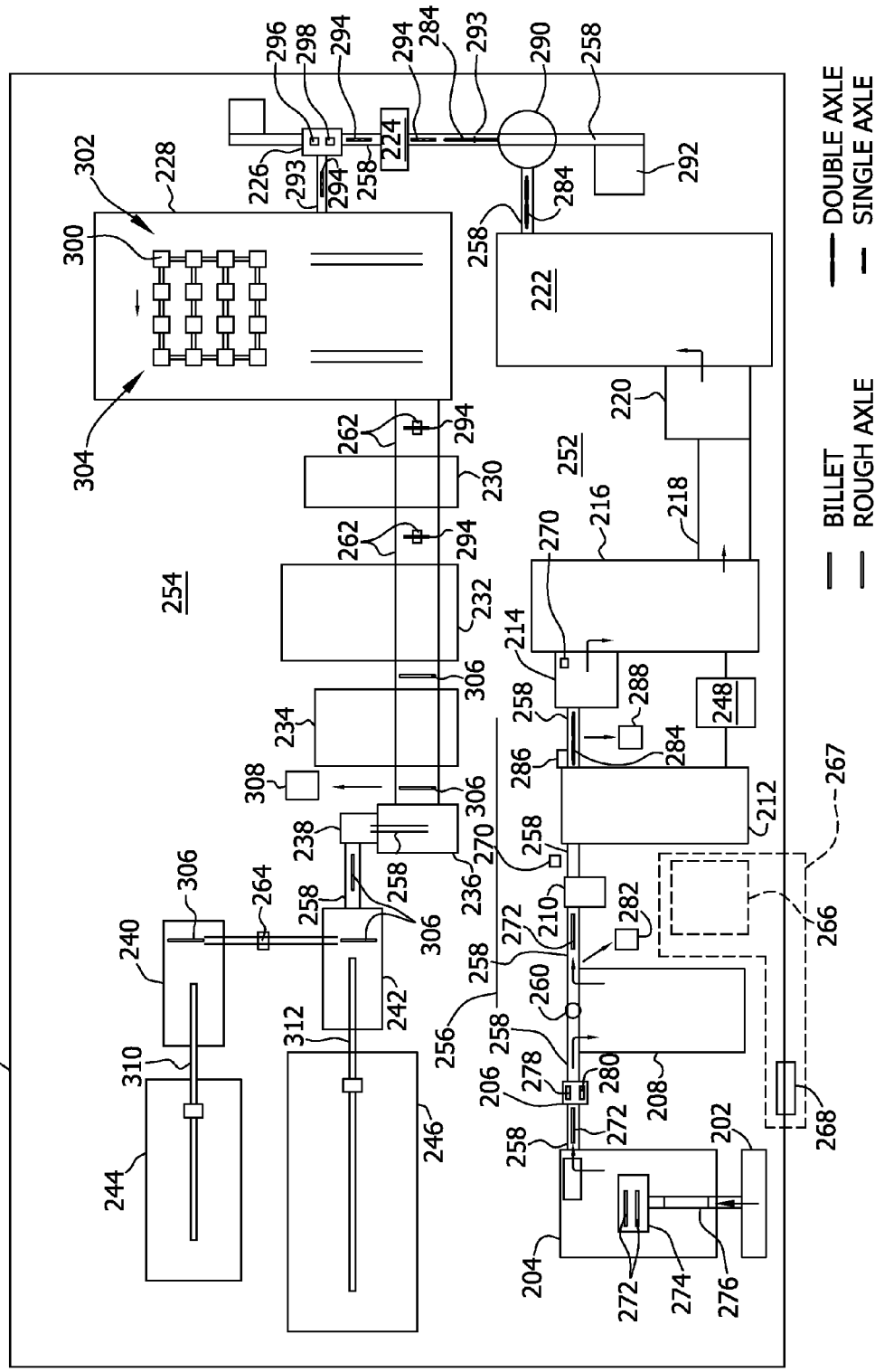
FIG. 3 is a schematic view of an exemplary manufacturing system for performing the method shown in FIG. 2.

FIG. 3 is a schematic view of an exemplary manufacturing system 200 for performing method 100 (shown in FIG. 2). In the exemplary embodiment, each station, component, and/or sub-system is automated and continuous with a previous and subsequent station, component, and/or sub-system. System 200 includes, in a series connected by an automated transport system, a receiving area 202, an inbound billet handling system 204, a billet cutting and marking system 206, a furnace 208, a descaler 210, a forging system 212, a post-forge (PF) cooling system 214, a normalizing system 216, an optional quenching system 218, a post-normalizing (PN) cooling system 220, a tempering system 222, an axle separation system 224, a straightening system 226, a cooling area 228, an end facing system 230, a machining system 232, an inspection system 234, an axle marking system 236, a washing system 238, a truck storage and loading area 240, a train and truck storage and loading area 242, a truck shipping area 244, and a train and truck shipping area 246. Receiving area 202, inbound billet handling system 204, billet cutting and marking system 206, furnace 208, descaler 210, forging system 212, PF cooling system 214, normalizing system 216, quenching system 218, PN cooling system 220, tempering system 222, axle separation system 224, straightening system 226, cooling area 228, end facing system 230, machining system 232, inspection system 234, axle marking system 236, washing system 238, truck storage and loading area 240, train and truck storage and loading area 242, truck shipping area 244, and train and truck shipping area 246 are considered to be sub-systems of system 200.

Receiving area 202, inbound billet handling system 204, billet cutting and marking system 206, furnace 208, descaler 210, forging system 212, PF cooling system 214, normalizing system 216, quenching system 218, PN cooling system 220, tempering system 222, axle separation system 224, straightening system 226, cooling area 228, end facing system 230, machining system 232, inspection system 234, axle marking system 236, washing system 238, truck storage and loading area 240, train and truck storage and loading area 242, truck shipping area 244, and train and truck shipping area 246 may be referred to herein respectively as a receiving station, an inbound billet station, a billet cutting and marking station, a heating station, a descaler station, a forging station, a PF cooling station, a normalizing station, a quenching station, a PN cooling station, a tempering station, an axle separation station, a straightening station, a cooling or post-heat treating cooling station, an end facing station, a machining station, an inspection station, an axle marking station, a washing station, a truck storage and loading station, a train storage and loading station, a truck shipping station, and a train shipping station. A heat treating station, or a heat treating system, includes PF cooling system 214, normalizing system 216, quenching system 218, PN cooling system 220, and tempering system 222. Within the heat treating station or system, the temperature of an axle therein is automatically altered to produce an axle having predetermined metallurgical properties, such as strength, ductility, elasticity, electrical resistivity, thermal conductivity, thermal expansion coefficient, fatigue limit, and/or hardness. Further, a "product" as referred to herein includes billet 272 and/or axles formed from billet 272, such as axles 284, 294, and/or 306.

System 200 is controlled by a control system 248 that is communicatively coupled with the automated transport system, receiving area 202, inbound billet handling system 204, billet cutting and marking system 206, furnace 208, descaler 210, forging system 212, PF cooling system 214, normalizing system 216, quenching system 218, PN cooling system 220, tempering system 222, axle separation system 224, straightening system 226, cooling area 228, end facing system 230, machining system 232, inspection system 234, axle marking system 236, washing system 238, truck storage and loading area 240, train storage and loading area 242, truck shipping area 244, and train shipping area 246. Although, control system 248 is illustrated as being communicatively coupled to forging system 212 and normalizing system 216, it will be understood that control system 248 is communicatively coupled with other components, sub-systems, and/or devices within system 200 for receiving information and transmitting instructions. System 200 and/or control system 248 are configured to manufacture a plurality of different types of axles for railcars from billets of raw material.

Further, system 200 is housed within a single building 250 that includes a forging side 252 and a machining side 254, which are separated by a wall 256. Building 250 includes a single roof that substantially covers system 200. Forging side 252 is considered to define a first chamber of building 250, and machining side 254 is considered to define a second chamber of building 250. Forging side 252 includes receiving area 202, inbound billet handling system 204, billet cutting and marking system 206, furnace 208, descaler 210, forging system 212, PF cooling system 214, normalizing system 216, quenching system 218, PN cooling system 220, and tempering system 222. Machining side 254 includes axle separation system 224, straightening system 226, cooling area 228, end facing system 230, machining system 232, inspection system 234, axle marking system 236, washing system 238, truck storage and loading area 240, train storage and loading area 242, truck shipping area 244, and train shipping area 246. Wall 256 separating forging side 252 and machining side 254 is a solid wall that facilitates preventing heat from transferring from forging side 252 to machining side 254. More specifically, wall 256 is a solid wall that is configured to deflect heat upward and helps to create a constant air flow to exhaust heat out of building 250. As explained below in greater detail, building 250 also includes a plurality of air fans 266 positioned on a roof of building 250, and air-intake louvers 268 positioned at various locations on the side of building 250. The air fans 266 create a negative pressure on forging side 252 to help discharge heat and contaminants, such as dirt and other small debris, from forging side 252.

Automated transport system, or product transport system, includes conveyors 258, an automated manipulator 260, gantry 293, a line gantry 262, a gantry 264, walking beam tables, and/or any other suitable automated transport system. The term "gantry," as used herein, refers to a gantry crane. The automated transport system is communicatively coupled to control system 248. In the exemplary embodiment, conveyors 258 are conveyors supplied by Güdel GmbH of Osteedrburken, Germany ("Güdel"), automated manipulator 260 is an automatic manipulator manufactured by Glama Maschinenbau GmbH of Gladbeck, Germany ("Glama"), and gantries 262, 264, and 293 are gantries supplied by Güdel, such as a Güdel FP-6 gantry. In an alternative embodiment, gantries 262, 264, and/or 293 are any other suitable type of crane and/or automatic lifting system that is configured to transport products through system 200. Alternatively, conveyors 258, manipulator 260, and/or gantries 262, 264, and/or 293 may be any suitable conveyor, manipulator, robotic means, gantry, crane, shuttle, lifting means, tables, and/or transport means that enables system 200 to function as described herein. In the exemplary embodiment, the automated transport system is continuous from receiving area 202 to shipping areas 244 and 246. Further, the automated transport system is controlled by control system 248 to automatically move the products throughout system 200. Moreover, on forging side 252, the automated transport system moves products at a height of about twelve feet from a floor of building 250, and on machining side 254, the automated transport system moves products at a height of about five feet from the floor. As such, the automated transport system includes means for lowering a product from forging side 252 to machining side 254. Alternatively, the automated transport system may be located at any suitable height from the floor for handling products.

Further, system 200 includes a venting system 267 for creating a negative pressure on forging side 252 of building 250. More specifically, system 200 includes a plurality of fans 266 on a roof of building 250 that draw air from forging side 252 and discharge the air to the ambient to reduce the pressure of forging side 252. Building 250 includes louvers 268 defined within an exterior wall of building 250 to draw air from the ambient into building. In one embodiment, the number of fans 266 in operation and/or the speed of fans 266 is varied to maintain the negative pressure on forging side 252. In an alternative embodiment, venting system 267 includes any suitable components, devices, and/or processes for maintaining a negative pressure on forging side 252 of building 250. In the exemplary embodiment, venting system 267 facilitates maintaining negative pressure on forging side 252 of wall 256 to discharge contaminants, such as warmed, dirty air, created during a forging process from building 250. As such, the negative pressure prevents contaminants, such as dirt and/or dust, from migrating to other areas of building 250, such as machining side 254, and confines the forging contaminants to forging side 252. Accordingly, venting system 267 facilitates maintaining the cleanliness necessary for performing a machining process within machining side 254 of building 250.

System 200 also includes a plurality of sensors positioned throughout building 250 and communicatively coupled to control system 248 to monitor and/or control automated system 200. For example, system 200 includes infrared (IR) sensors 270, such as IR sensors supplied by Can-Eng Furnaces International Ltd. of Niagara Falls, N.Y. and Ontario ("Can-Eng"), positioned after descaler 210, in forging system 212, within PF cooling system 214, within PN cooling system 220, and cooling area 228 to monitor and/or control cooling rates of axles within such systems. System 200 may include sensors in addition to, and/or as an alternative to, IR sensors 270. More specifically, system 200 includes any suitable sensors that enable system 200 to be monitored and/or controlled to function as described herein.

In the exemplary embodiment, receiving area 202 is configured to receive shipments of raw materials. More specifically, steel billets 272 of bar stock that are, for example, about 15 feet to about 33 feet in length with various diameters, are received at and stored in receiving area 202 until a billet 272 is used to form a rough axle 306, as described herein. Billets 272 are preferably formed from vacuum degassed steel. Within receiving area 202, a code, such as a barcode, attached to each billet 272 is read and the information is entered into control system 248. The information for each billet 272 may include information, such as heat lot, heat code, chemical composition, and/or steel mill information. The billet information follows each billet 272 through system 200 via control system 248, as described herein. Received materials are transferred to inbound billet handling system 204 for storage and/or further processing.

In the exemplary embodiment, inbound billet handling system 204 is configured to transfer billets 272 from receiving area 202 to conveyor 258, which transfers billets 272 to billet cutting and virtual marking system 206. More specifically, in the exemplary embodiment, inbound handling system 204 includes racks 274 and an automated gantry system 276 for moving billets 272 from receiving area 202 onto a rack 274. More specifically, gantry 276 is an automated gantry system supplied by Güdel and includes an overhead conveyor and a motorized arm for moving billets 272 according to instructions from control system 248. Racks 274 are stair-step shaped to enable the motorized arm to move billet 272 to and from racks 274. In one embodiment, each rack 274 can store five billets 272 thereon. Alternatively, inbound handling system 204 includes any suitable automated system and/or device for transferring billets 272 from receiving area 202 for further processing and/or any suitable support structures for inbound materials.

In the exemplary embodiment, billet cutting and marking system 206 includes a cutting system 278 and a marking system 280. Cutting system 278 is configured to automatically size a billet 272 for forming a double axle and/or a single therefrom using physical properties of billet 272 and a desired type of finished axle. More specifically, cutting system 278 receives information from control system 248 regarding the type of axle that will be formed from billet 272. Using the type of axle and the weight of billet 272, billet 272 is cut to a length that provides the mass required to form the indicated type of axle. In the exemplary embodiment, cutting system 278 is a carbide saw manufactured by Advanced Machine and Engineering Co. of Rockford, Ill. ("AME"). Alternatively, cutting system 278 is any suitable system and/or device that is able to automatically size a billet to correspond to a pre-determined size.

In the exemplary embodiment, marking system 280 is configured to assign a tracking identifier to each billet 272 to track billet 272 and billet information through system 200. More specifically, the tracking identifier is a virtual serial number assigned and tracked by control system 248. In one embodiment, the tracking identifier is a code that is readable by a Supervisory Control And Data Acquisition (SCADA) system supplied by Can-Eng executing Wonderware software by Invensys Systems, Inc. of Lake Forest, Calif. More specifically, the code is readable by the SCADA system through input received from photo eyes located throughout system 200. In the exemplary embodiment, the tracking identifier is used by control system 248 and components of system 200 to automatically form a particular type of axle from a billet 272. Control system 248 may include a display to allow an operator of system 200 to graphically view, for example, where each billet 272 and/or axle 284, 294, and/or 306 is within system 200 according to the assigned tracking identifier and/or temperatures within the components of system 200. The tracking identifiers include the information about each billet 272 that was entered into control system 248 at receiving area 202.

Conveyor 258 conveys billet 272 from cutting and marking system 206 to furnace 208. Furnace 208 is, in the exemplary embodiment, a rotary furnace, such as a rotary furnace manufactured by Can-Eng. Alternatively, furnace 208 is any suitable furnace that enables system 200 to function as described herein. In the exemplary embodiment, furnace 208 is configured to heat billets 272 to about 2100° F. to about 2200° F. while having a furnace shell temperature between about 150° F. and about 200° F. Furthermore, manipulator 260 is positioned near furnace 208 for automatically inserting billets 272 into furnace 208 and automatically removing heated billets 272 from furnace 208. More specifically, manipulator 260 is positioned and programmed to removed a billet 272 from conveyor 258 and insert billet 272 into furnace 208. After billet 272 has been heated within furnace 208, manipulator 260 is programmed to automatically remove heated billet 272 from furnace 208 and place billet 272 on conveyor 258. Further, it is determined, for example, manually, whether a heated billet 272 satisfies predetermined conditions. If heated billet 272 does not satisfy the conditions, manipulator 260 places billet 272 within a billet rejection area 282, and control system 248 changes the status of the assigned tracking identifier corresponding to the unsatisfactory billet to rejected. Rejected billets are allowed to cool and are removed from system 200. If heated billet 272 does satisfy the conditions, manipulator 260 places billet 272 on conveyor 258 as described above. Alternatively, manipulator 260 may include programs for performing any suitable processes that enable system 200 to function as described herein.

In the exemplary embodiment, descaler 210 is a water descaler, such as a high-pressure water descaler supplied by Can-Eng, that is built around conveyor 258. Alternatively, descaler 210 is any suitable descaler that enables system 200 to function as described herein. In the exemplary embodiment, descaler 210 sprays billet 272 with water pressurized to about 3000 psi for about 10 seconds to about 30 seconds to facilitate removing primary scale, or slag, from billet 272. By removing scale from billet 272 before billet 272 enters forging system 212, the service life of forging system 212 is improved. After descaling, conveyor 258 conveys billet 272 to forging system 212.

Forging system 212 is, in the exemplary embodiment, a Radial Forging Machine, Type RF 35, manufactured by GFM GmbH of Steyr, Austria ("GFM"). Alternatively, forging system 212 is any forging system capable of forming a double axle and/or a single axle from a billet 272. In the exemplary embodiment, a series of arms removes a billet 272 from conveyor 258 and moves billet 272 into and out of forging system 212. Once billet 272 is in forging system 212, forging system 212 automatically forms an axle assembly, such as a double axle 284, to near net shape, from a billet 272 according to the type of finished axle as indicated by the tracking identifier assigned by control system 248. As used herein, "near net shape" refers to a shape that includes the approximate diameters of the finished axle, but not the specific diameter transitions, such as steps between diameters. Alternatively, forging system 212 automatically forms the axle assembly as a single axle. In the exemplary embodiment, forging system 212 is controlled by a computer numerical control (CNC) control system to hot build double axle 284 by hammering billet 272 with a plurality of different rams, such as four different rams, that are arranged within forging system 212.

Forging system 212 includes at least a pair of chuck heads to guide a product through forging system 212. Double axles 284 are discharged from forging system 212 for transport to PF cooling system 214. Known axle forging system and/or process separate a double axle into single axles after the double axle is formed in a forge. However, in the system 200 described herein, double axle 284 remains as a double axle until machining begins to facilitate reducing parts in components and increasing the ease of moving axles through system 200.

System 200 includes an automated double axle inspection system 286 that determines whether a double axle 284 satisfies pre-determined conditions as transmitted to axle inspection system 286 from control system 248. More specifically, inspection system 286 includes optical cameras programmed to measure dimensions of double axle 284 and compare measured values with determined dimension values based on the type of axle indicated by the assigned tracking identifier for double axle 284. If double axle 284 does not satisfy the conditions, double axle 284 is placed within a double axle rejection area 288, and control system 248 changes the status of the assigned tracking identifier corresponding to the unsatisfactory double axle to rejected. Rejected axles are moved to rejection area 288 manually and/or automatically. Rejected double axles are allowed to cool and are removed from system 200. If double axle 284 does satisfy the conditions, double axle 284 is placed on conveyor 258 to PF cooling system 214. Alternatively, double axle inspection system 286 may include programs for performing any suitable processes that enable system 200 to function as described herein. Furthermore, double axle inspection system 286 may be included within forging system 212.

In the exemplary embodiment, PF cooling system 214 is configured to cool double axles 284 therein. More specifically, PF cooling system 214 includes cooling tables, such as continuous walking beam tables, and overhead hoods therein. The hoods draw air from the cooling tables and discharge the air to ambient. As such, double axles 284 are passively cooled within PF cooling system 214. Further, the tables within PF cooling system 214 are movable to convey double axles 284 from axle inspection system 286 to normalizing system 216 as double axles 284 cool. In the exemplary embodiment, a powered roller conveyor table transports axles 284 to normalizing system 216. As such, PF cooling system 214 also enables the manufacturing process to be continuous.

Normalizing system 216 is configured to perform a single normalizing process to heat treat double axles 284. More specifically, normalizing system 216 heat treats double axles 284 to achieve predetermined mechanical properties, such as strength and ductility. In one embodiment, double axles 284 are heated to between about 1100° F. and about 1650° F. Because vacuum degassed steel is used to form double axles 284, only a single normalizing process, as opposed to the known double normalizing process, is performed to achieve the predetermined properties. Further, axles 284 are continuously moved though normalizing system 216 by, for example, continuous walking beam tables. In the exemplary embodiment, normalizing system 216 is a normalizing furnace manufactured by Can-Eng, however, it will be understood that any suitable normalizing system that is capable of performing a single normalizing process may be used as normalizing system 216. Axle 284 is conveyed by, for example, a powered roller conveyor table to quenching system 218.

Quenching system 218 is configured to optionally quench double axles 284 after being normalized, depending on the type of axle and/or other conditions requested by a buyer. More specifically, quenching system 218 is configured to lower a temperature of double axles from a temperature of about 1600° F. to about 1800° F. to a temperature of about 200° F. to about 600° F. In the exemplary embodiment, quenching system 218 includes a powered roller conveyor table and full submerging tank supplied by Can-Eng. Alternatively, quenching system 218 includes any suitable components and/or devices that enable quenching system 218 to function as described herein. When quenching is not required, double axles 284 are conveyed through quenching system 218 by the powered roller conveyor table to PN cooling system 220.

PN cooling system 220 is configured to cool double axles 284 therein. More specifically, PN cooling system 220 includes cooling tables, such as continuous walking beam tables, and overhead hoods therein. The hoods draw air from the cooling tables and discharge the air to ambient. As such, double axles 284 are passively cooled within PN cooling system 220. Further, the tables within PN cooling system 220 are movable to convey double axles 284 from quenching system 218 to tempering system 222 as double axles 284 cool. PN cooling system 220 is used in system 200 to replace the known method of pile-cooling axles that includes covering the axles with dirt for an extended period of time of about 32 hours to about 48 hours. As such, PN cooling system 220 facilitates reducing cooling time after normalization, as compared to the pile-cooling method. Moreover, PN cooling system 220 also enables the manufacturing process to be continuous.

Axle 284 is conveyed by, for example, a powered roller conveyor table, to tempering system 222. Tempering system 222 is configured to transform brittle martensite within double axles 284 into bainite or a combination of ferrite and cementite by heating double axles 284 to between about 1000° F. and about 1350° F. In the exemplary embodiment, tempering system 222 is a tempering furnace manufactured by Can-Eng that includes a conveyor system, such as a continuous walking beam table, therein. Alternatively, tempering system 222 is any suitable tempering system that enables system 200 to function as described herein. In the exemplary embodiment, conveyor 258 is positioned at the end of tempering system 222 to remove double axles 284 therefrom.

Conveyor 258 includes a roundabout 290 and a buffer 292 after tempering system 222. Roundabout 290 automatically directs double axles 284 to machining side 254 or to buffer 292 according to programming within roundabout 290. More specifically, in the exemplary embodiment, roundabout 290 rotates and lowers double axle 284 to a lower gantry 293 on machining side 254. Gantry 293 passes through axle separation system 224 which is configured to separate a double axle 284 into two single axles 294. More specifically, axle separation system 224 cuts through double axle 284 at joined ends to form single axles 294. For example, axle separation system 224 forms four cuts in double axle 284 such that two cuts are near the center of double axle 284 and one cut is at each end of double axle 284 to achieve a final length of each single axle 294 based on instructions from control system 248 according to the assigned tracking identifier for the single axles 294. In the exemplary embodiment, axle separation system 224 is a rotary saw manufactured by AME, however, axle separation system 224 may be any suitable system, device, and/or unit for separating double axle 284 into single axles 294 as described herein. In an alternative embodiment, when a single axle is forged in forging system 212, axle separation system 224 is used to adjust the length of the single axle. In a further alternative embodiment, axle separation system 224 separates the forged axle assembly into any suitable axle configuration.

Straightening system 226 is positioned after axle separation system 224 and includes a verification system 296 and a correction system 298. Verification system 296 is configured to check the straightness of each single axle 294 by rotating single axle 294 to check for high and low portions of axle 294. If an axle 294 does not satisfy straightness requirements, correction system 298 automatically corrects the straightness of axle 294 by indexing axle 294 to a high portion and pressing the high portion. More specifically, straightening system 226 includes a 400-ton gap frame press manufactured by Williams, White & Co. of Moline, Ill., which is a division of Doerfer Companies ("Williams White"). If axle 294 is not corrected within a predetermined number of attempts, axle 294 is rejected, and control system 248 changes the status of the assigned tracking identifier corresponding to the unsatisfactory single axle to rejected. Rejected single axles are allowed to cool and are removed from system 200.

Cooling area 228 includes a plurality of pallets 300 that are moved slowly throughout cooling area 228 to cool single axles 294 thereon. More specifically, cooling area 228 is configured to cool axles 294 from about 1200° F. to about 200° F. in about six to ten hours while avoiding inducing warping and/or brittleness in axles 294. Known manufacturing processes require about 32 hours to about 48 hours for cooling of axles before machining. As such, cooling area 228 facilitates reducing cooling time of axles 294, as compared to known manufacturing processes. In the exemplary embodiment, pallets 300 are moved by a conveying system manufactured by Güdel, and cooling area 228 includes thirty-six pallets 300 that can each hold seven axles 294. More specifically, cooling area 228 includes a plurality of rows of pallets 300 that move each pallet 300 from a hot side 302 to a cool side 304 of cooling area 228 along each row. As axles 294 are moved along each row, axles 294 are passively cooled using, for example, hoods as described above. At cool side 304, single axles 294 are removed from pallets 300 and cooling area 228 for further processing within system 200. In an alternative embodiment, cooling area 228 includes any suitable number or configuration of pallets 300 and/or any suitable means for moving pallets 300 that enable system 200 to function as described herein. Alternatively, cooling area 228 includes any suitable means for achieving the cooling of axles, as described herein. In the exemplary embodiment, overhead line gantry 262, such as Line Gantry FP-7HD manufactured by Güdel, removes an axle 294 from cooling area 228 for machining. Line gantry 262 "handshakes" with downstream operations, such as end facing system 230, machining system 232, and/or inspection system 234, to start or stop an operation based on a "GO/NO GO" signal via control system 248 from gantry 262 to the operation or vice versa.

End facing system 230 includes machines for facing ends of axle 294 by removing material from each end of axle 294 and drilling a center hole in each end of axle 294. In the exemplary embodiment, end facing system 230 includes two end facing, three-axis, CNC controlled machines manufactured by SEMA GmbH of Traunkirchen, Austria ("SEMA"), for centering and end facing. Line gantry 262 moves axle 294 from cooling area 228, through end facing system 230, and to machining system 232. In an alternative embodiment, end facing system 230 includes any suitable systems, devices, and/or machines that enable system 200 to function as described herein.

Machining system 232 is located after end facing system 230 and is configured to remove a portion of material from a wheel seat and a bearing seat of each axle 294 and to cut a barrel of each axle 294. In the exemplary embodiment, machining system 232 includes a plurality of lathes, such as lathes manufactured by Niles-Simmons Hegenscheidt Group of Chemnitz, Germany ("N-S"). More specifically, machining system 232 includes four Nile N40 roughing lathes that are four-axis CNC lathes configured to leave approximately ⅛ of an inch to approximately ¼ of an inch of excess material for finishing on a wheel seat and a bearing seat and to cut the barrel of axle 294. In the exemplary embodiment, line gantry 262 conveys axles 294 through the series of lathes. More specifically, between individual machining operations, axles 294 are stored on axle buffers and are machined using a "first in—first out" approach. Alternatively, machining system 232 includes any suitable systems, devices, and/or machines that enable system 200 to function as described herein. In the exemplary embodiment, line gantry 262 removes rough axles 306 from machining system 232 and into inspection system 234.

Inspection system 234 includes a plurality of inspection sub-systems, such as an ultrasonic sub-system, a magnetic particle testing sub-system, an automated visual sub-system, and/or a laser measuring sub-system, for inspecting each rough axle, or machined axle, 306. In the exemplary embodiment, inspection system 234 includes an ultrasound testing apparatus manufactured by General Electric Company of Schenectady, N.Y. ("GE"), a magnaflux technology apparatus manufactured by K+D Flux-Technic GmbH+Co. KG of Mögglingen, Germany ("K+D"), an APIS visual inspection apparatus, and a laser measurement device manufactured by N-S. The ultrasound apparatus is a full immersion apparatus that detects voids and/or discontinuities in an axle 306. The magnaflux technology apparatus detects scratches and/or cracks on a surface of axle 306, and the APIS visual inspection apparatus includes a camera to detect deep gouges and satisfy criteria that each axle 306 is manually viewed. The laser measurement apparatus measures a length of axle 306, a diameter of barrel of axle 306, and diameters of the wheel and bearing seats of axle 306. Alternatively, inspection system 234 uses any suitable technology for inspecting rough axles 306 to determine whether an axle 306 satisfies predetermined conditions. In the exemplary embodiment, inspection system 234 automatically determines whether an axle 306 satisfies the predetermined conditions, and automatically rejects rough axles 306 that do not satisfy the conditions to a rough axle rejection area 308. If rough axle 306 is rejected, control system 248 changes the status of the assigned tracking identifier corresponding to the unsatisfactory rough single axle to rejected. Rejected rough single axles are removed from system 200.

Line gantry 262 extends between cooling area 228 and axle marking system 236. Axle marking system 236 is configured to mark a final identifier onto each rough axle 306. The final identifier is marked using any suitable process that enables the tracking identifier to withstand use of axle 306 with a railcar, such as railcar 10 (shown in FIG. 1). The final identifier may be a barcode, symbol, and/or any other suitable identifier marked on to rough axle 306 at any suitable location to be read by a subsequent identifier reading device during shipping, finishing, and/or use of axle 306 to provide information related to each axle 306. In the exemplary embodiment, the final identifier is a barcode that is adhered to an end face or barrel of rough axle 306. Further, the end face of axle 306 is stamped by a needle stamping station manufactured by Borries Markier-Systeme GmbH of Pliezhausen, Germany ("Borries"), and the final identifier is read using a charge coupled device (CCD) camera and a laser line. The final identifier includes information from billet barcode and the tracking identifier used during manufacturing such that the final identifier includes, for example, axle manufacturer information, heat code, heat lot, and/or steel supplier information. Alternatively, the final identifier is any suitable identifier marked by any suitable marking device to be read by any suitable identifier reading device. In the exemplary embodiment, after the final identifier is attached to an axle 306, the tracking identifier used during manufacturing continues to be associated with each axle 306.

Washing system 238, following axle marking system 236, is configured to wash each rough axle 306 and apply a rust inhibitive spray to each axle 306. Conveyor 258 extends from washing system 238 to at least one of truck storage and loading area 240 and train storage and loading area 242. Gantry 264 is configured to automatically receive rough axles 306 from conveyor 258 and place axles 306 within truck storage and loading area 240 or train storage and loading area 242. Gantry 264 transmits a location of each axle 306 to control system 248 using the tracking identifier to later locate an axle 306 within area 240 and/or 242. Further, gantry 264 is configured to automatically move axles 306 between truck storage and loading area 240 and train storage and loading area 242 depending on shipping requirements and the tracking identifier assigned to each axle 306. In the exemplary embodiment, gantry 264 is manufactured by Güdel and includes multiple arms that can pick and place an axle 306. Truck storage and loading area 240 and train storage and loading area 242 are each configured to store rough axles 306 therein before axles 306 are shipped. More specifically, axles 306 are stored in a truck buffer and a train buffer, such as buffers manufactured by Güdel, before shipping. The buffers allow three-shift production of axles 306 with shipping during normal business hours. Gantry 264 is movable between the buffers for transporting axles 306 to or from each buffer.

A truck output conveyor 310, such as an automated conveyor and gantry manufactured by Güdel, extends between truck storage and loading area 240 and truck shipping area 244. Truck output conveyor 310 is configured to transfer axles 306 from storage and loading area 240 to a truck within truck shipping area 244. More specifically, truck output conveyor 310 is configured to load axles 306 onto the truck in either a parallel orientation or a perpendicular orientation. In one embodiment, truck output conveyor 310 is programmed to automatically load forty axles per truck. In the exemplary embodiment, output conveyor automatically locates the four corners of a truck trailer, and once a first axle is positioned and chucked on the truck trailer, output conveyor 310 automatically loads the remaining axles of the shipments on the truck trailer.

A train output conveyor 312, such as an automated conveyor and gantry manufactured by Güdel, extends between train storage and loading area 242 and train shipping area 246. Train output conveyor 312 is configured to transfer axles 306 from storage and loading area 242 to a train car within train shipping area 246. More specifically, train output conveyor 312 is configured to load axles 306 onto the train in either a parallel orientation or a perpendicular orientation. In one embodiment, train output conveyor 312 is programmed to automatically load eighty axles per train. In the exemplary embodiment, output conveyor 312 automatically locates the four corners of a train car, and once a first axle is positioned and chucked on the train car, output conveyor 312 automatically loads the remaining axles of the shipments on the train car. Train shipping area 246 may also be used to load a truck for shipping rough axles 306.

Because system 200 includes separate shipping areas 244 and 246 and separate output conveyors 310 and 312 for truck and train shipments, a truck and a railcar, or two trucks, can be loaded simultaneously by output conveyors 310 and 312 to facilitate increasing shipping capacity. To further increase shipping capacity, in an alternative embodiment, truck shipping area 244 and/or train shipping area 246 may include multiple bays each including an output conveyor 310 or 312. Alternatively, truck shipping area 244 and/or train shipping area 246 may include multiple bays, wherein one output conveyor 310 or 312 services multiple bays.

During exemplary operation of system 200, billets 272 are received at receiving area 202 and are transferred to conveyor 258 via inbound billet handling system 204. Once on conveyor 258, billets 272 are continuously and automatically moved through system 200 until rough single axles 306 are formed and ready to be shipped. After being placed on conveyor 258 from receiving area 202, billet 272 is cut by billet cutting system 278 to a size suitable for forming a double axle 284 of a predetermined type from billet 272. Further, billet marking system 280 assigns a tracking identifier to billet 272 in control system 248 for tracking billet 272 throughout system 200 and for controlling system 200 to form the predetermined type of axle from billet 272. Billet 272 is then conveyed to manipulator 260 for insertion into furnace 208. Heated billet 272 is removed from furnace 208 by manipulator 260 and positioned on conveyor 258 for transfer to descaler 210. Billets 272 may also be rejected after passing through furnace 208 and placed within rejected billet area 282. After descaling, billet 272 is transferred to forge 212 to be forged into a double axle 284.

Double axle 284 is either rejected or accepted. Rejected double axles 284 are placed within rejected double axle area 288, and accepted double axles 284 are conveyed to PF cooling system 214. Within PF cooling system 214, double axles 284 are cooled by passive cooling. Cooled double axles 284 are transferred into normalizing system 216, in which double axles 284 undergo a single normalizing process. After normalizing, double axles 284 are optionally quenched by water within quenching system 218 such that, after quenching, double axles 284 are at a temperature of approximately 200° F. or above. Double axles 284 are transferred from quenching system 218 into PN cooling system 220 to passively cool before a tempering process. To perform the tempering process, double axles 284 are conveyed from PN cooling system 220 to tempering system 222. Tempered double axles 222 are conveyed, via conveyor 258 and a roundabout 290, from forging side 252 to machining side 254 of building 250 or to buffer 292 for storing double axles 284 until further processing or rejection.

During transfer to machining side 254, double axles 284 pass through axle separation system 224 to be separated into two single axles 294. Single axles 294 are conveyed to straightening system 226. Within straightening system 226, the straightness of each single axle 294 is determined, and any axles 294 that do not meet straightness requirements are straighten by straightening system 226. Straightened axles 226 are conveyed into cooling area 228 to be cooled from approximately 1200° F. to approximately 200° F. while being continuously moved through cooling area 228. Cooled axles 294 are transported by line gantry 262 from cooling area 228 to axle marking system 236. More specifically, cooled axles 294 are transferred from cooling area 228 to end facing system 230. Within end facing system 230, ends of axle 294 are faced and a hole is drilled and centered within axle 294. Axle 294 is then machined within machining system 232. More specifically, about ⅛ of an inch to about ¼ of an inch of excess material on a wheel seat and a bearing seat is left by machining system 232 and a barrel of axle 294 is cut by machining system 232.

After axle is machined to form a rough-machined axle 306, rough axle 306 is tested within inspection system 234 to determined physical properties of rough axle 306. More specifically, inspection system 234 detects voids and/or discontinuities, detects scratches and/or cracks on a surface of rough axle 306, detects gouges in rough axle 306, and/or measures a length of axle 306, a diameter of the barrel, and diameters of the wheel and bearing seats. Rough axles 306 that are determined to not meet specifications are rejected and placed within rejected rough axle area 308. Rough axles 306 at least meeting specifications are conveyed to axle marking system 236 that attaches a final identifier to rough axle 306. Marked rough axle 306 is washed within washing system 238, which also applies a rust inhibitive coating. Rough axle 306 is conveyed from washing system 238 to one of the storage and loading areas 240 or 244.

More specifically, in the exemplary embodiment, gantry 264 removes rough axle 306 from conveyor 258 and automatically places rough axle 306 within one of the storage and loading areas 240 or 242 according to programming within gantry 264. Rough axles 306 are retained within storage and loading areas 240 and/or 242 until rough axle 306 is allocated to a shipment. Once axle 306 is allocated, axle 306 is conveyed from storage and loading area 240 to a truck within truck shipping area 244 or from storage and loading area 242 to a train car within train shipping area 246. More specifically, axle 306 allocated to a truck shipment is transferred from truck storage and loading area 240 to the truck within truck shipping area 244 by truck output conveyor 310. Similarly, axle 306 allocated to a train shipment is transferred from train storage and loading area 242 to the train car within train shipping area 246 by train output conveyor 312. In the exemplary embodiment, system 200 can produce approximately 480 axles per day, with each sub-system of system 200 having a cycle time of about 3 minutes. Accordingly, each machined axle 306 is manufactured from a billet 272 in about 12 hours to about 24 hours, and more particularly within about 18 hours, as compared to known manufacturing system that require at least 36 hours to manufacture an axle.

Figure 4:
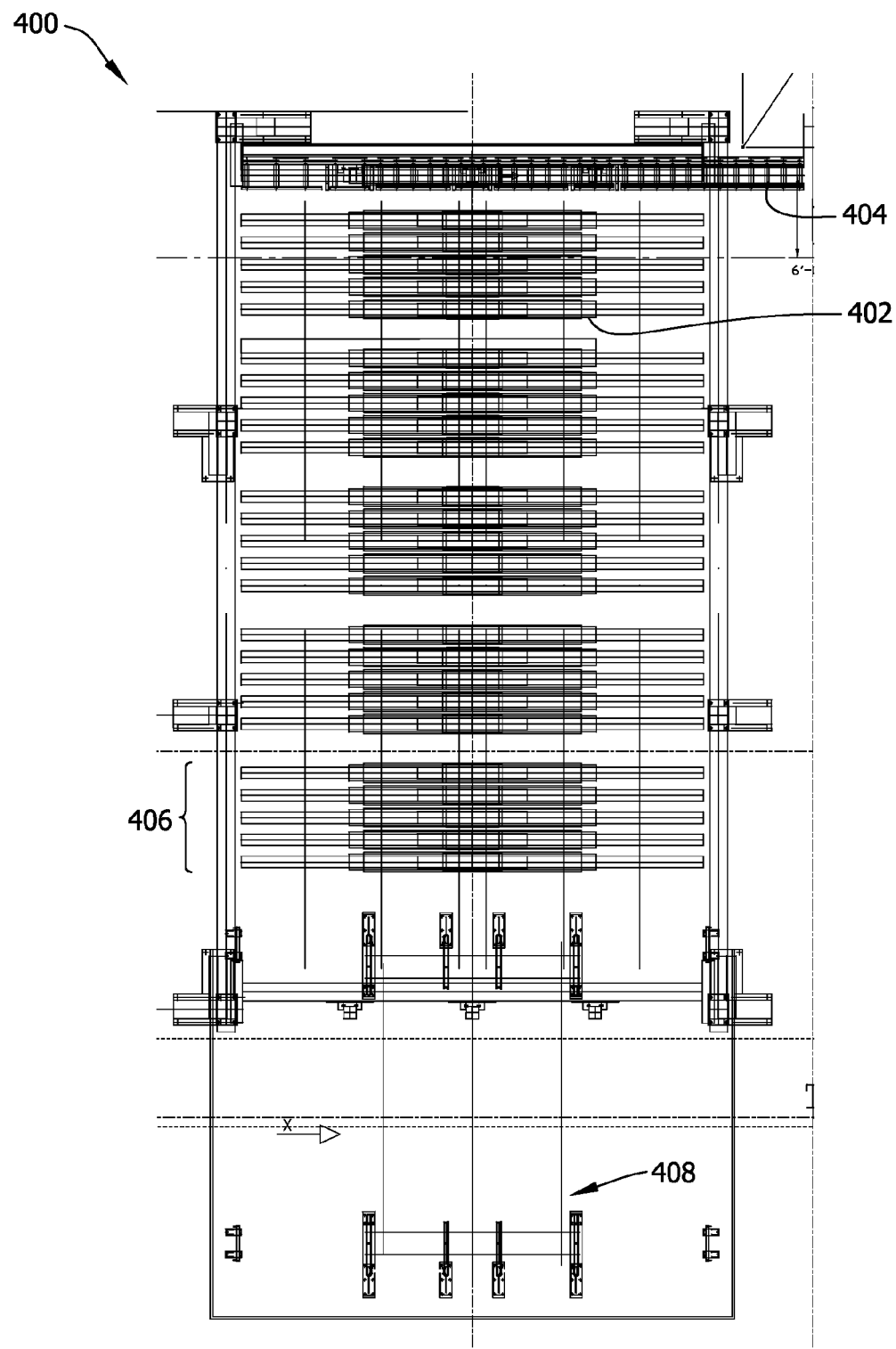
FIG. 4 is a top view of an exemplary inbound billet system that may be used with the system shown in FIG. 3.

FIGS. 4-15 are exemplary components of system 200 and, as such, similar components are labeled with similar references. Further, a "product" as referred to herein includes billet 402 and/or axles formed from billet 402, such as axles 801, 1008, and 1306. FIG. 4 is a top view of an exemplary inbound billet system 400 that may be used with system 200 (shown in FIG. 3) as inbound billet handling system 204 (shown in FIG. 3). Inbound billet handling system 400 is configured to transfer billets 402 from a receiving area to a conveyor 404, such as a conveyor supplied by Güdel, which may be used as conveyor 258 (shown in FIG. 3). More specifically, in the exemplary embodiment, inbound billet handling system 400 includes racks 406 and an automated gantry system 408 for moving billets 402 from the receiving area onto and/or off of a rack 406. More specifically, gantry 408 is an automated gantry system supplied by Güdel and includes an overhead conveyor and a motorized arm for moving billets 402 according to instructions from a system-wide control system. Racks 406 are stair-step shaped to enable the motorized arm to move billet 402 to and from racks 406. In one embodiment, each rack 406 can store five billets 402 thereon. Alternatively, inbound handling system 400 includes any suitable automated system and/or device for transferring billets 402 from the receiving area for further processing and/or any suitable support structures for inbound materials.

Figure 5:
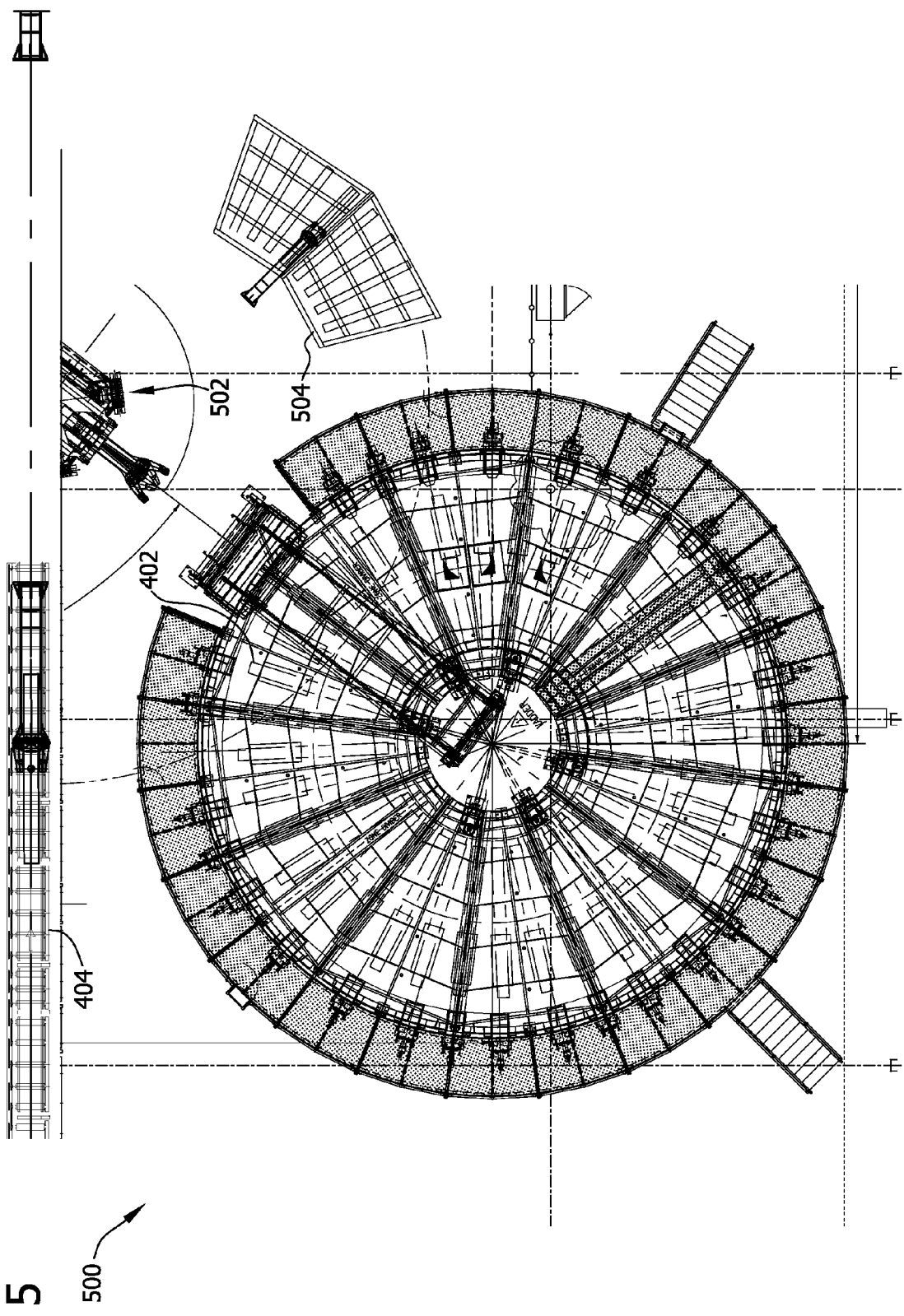
FIG. 5 is a top view of an exemplary furnace that may be used with the system shown in FIG. 3.

FIG. 5 is a top view of an exemplary furnace 500 that may be used with system 200 (shown in FIG. 3) as furnace 208 (shown in FIG. 3). Furnace 500 is a rotary furnace, such as a rotary furnace manufactured by Can-Eng. Alternatively, furnace 500 is any suitable furnace that enables system 200 to function as described herein. In the exemplary embodiment, furnace 500 is configured to heat billets 402 to between about 2100° F. and about 2200° F. while having a furnace shell temperature between about 150° F. and about 300° F. Furthermore, a manipulator 502, such as an automatic manipulator manufactured by Glama, is positioned near furnace 500 for automatically inserting billets 402 into furnace 500 and automatically removing heated billets 402 from furnace 500. More specifically, manipulator 502 is positioned and programmed to removed a billet 402 from conveyor 404 and insert billet 402 into furnace 500. After billet 402 has been heated within furnace 500, manipulator 502 is programmed to remove heated billet 402 from furnace 500 and place billet 402 on conveyor 404. Further, it is determined whether a heated billet 402 satisfies predetermined conditions. If heated billet 402 does not satisfy the conditions, manipulator 502 places billet 402 within a rejection area 504. Rejected billets are allowed to cool and are removed from system 200. If heated billet 402 does satisfy the conditions, manipulator 502 places billet 402 on conveyor 404 as described above. Alternatively, manipulator 502 may include programs for performing any suitable processes that enable system 200 to function as described herein.

Figure 6:
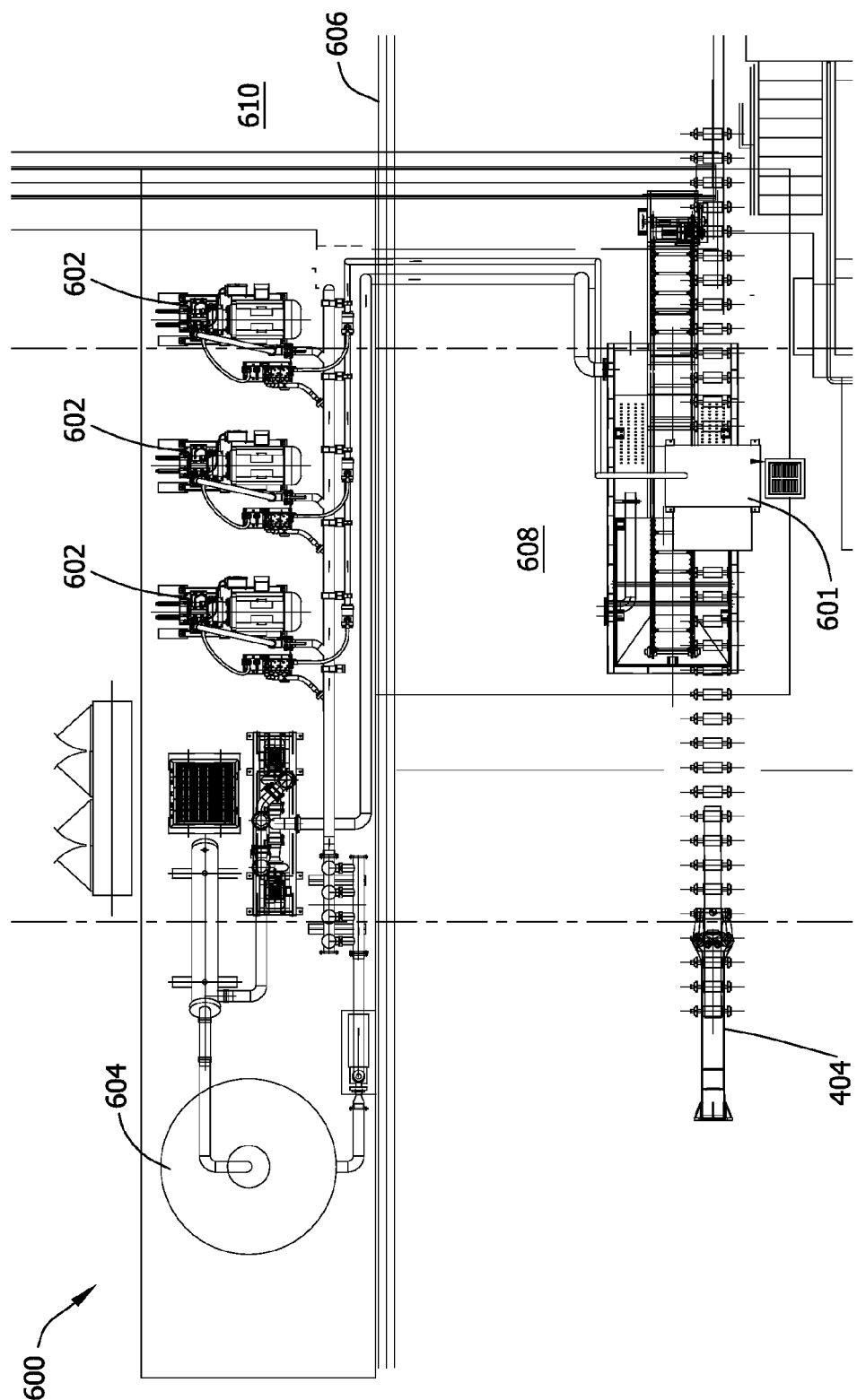
FIG. 6 is a top view of an exemplary descaler that may be used with the system shown in FIG. 3.

FIG. 6 is a top view of an exemplary descaler 600 that may be used with system 200 (shown in FIG. 3) as descaler 210 (shown in FIG. 3). Descaler 600 is a high-pressure water descaler supplied by Can-Eng, that is built around conveyor 404. Alternatively, descaler 600 is any suitable descaler that enables system 200 to function as described herein. In the exemplary embodiment, descaler 600 includes a housing 601, a plurality of pumps 602, and a water storage tank 604. Housing 601 includes a water spray therein, and pumps 602 and tanks 604 are configured to pump and store the water used for descaling billet 402 (shown in FIG. 4). Descaler 600 sprays billet 402 with water pressurized to about 3000 psi for about 10 seconds to about 30 seconds to facilitate removing primary scale, or slag, from billet 402. By removing scale from billet 402 before billet 402 enters a subsequent forging system, such as forging system 700 (shown in FIG. 7), the service life of the subsequent forging system is facilitated to be increased. Further, as illustrated in FIG. 6, a wall 606 separates a forging side 608, such as forging side 252 (shown in FIG. 3), from a machining side 610, such as machining side 254 (shown in FIG. 3). Wall 606 is similar to wall 256 (shown in FIG. 3), described herein. In the exemplary embodiment, pumps 602 and tank 604 are located on machining side 610 of wall 606 and housing 601 is on forging side 608 of wall 606.

Figure 7:
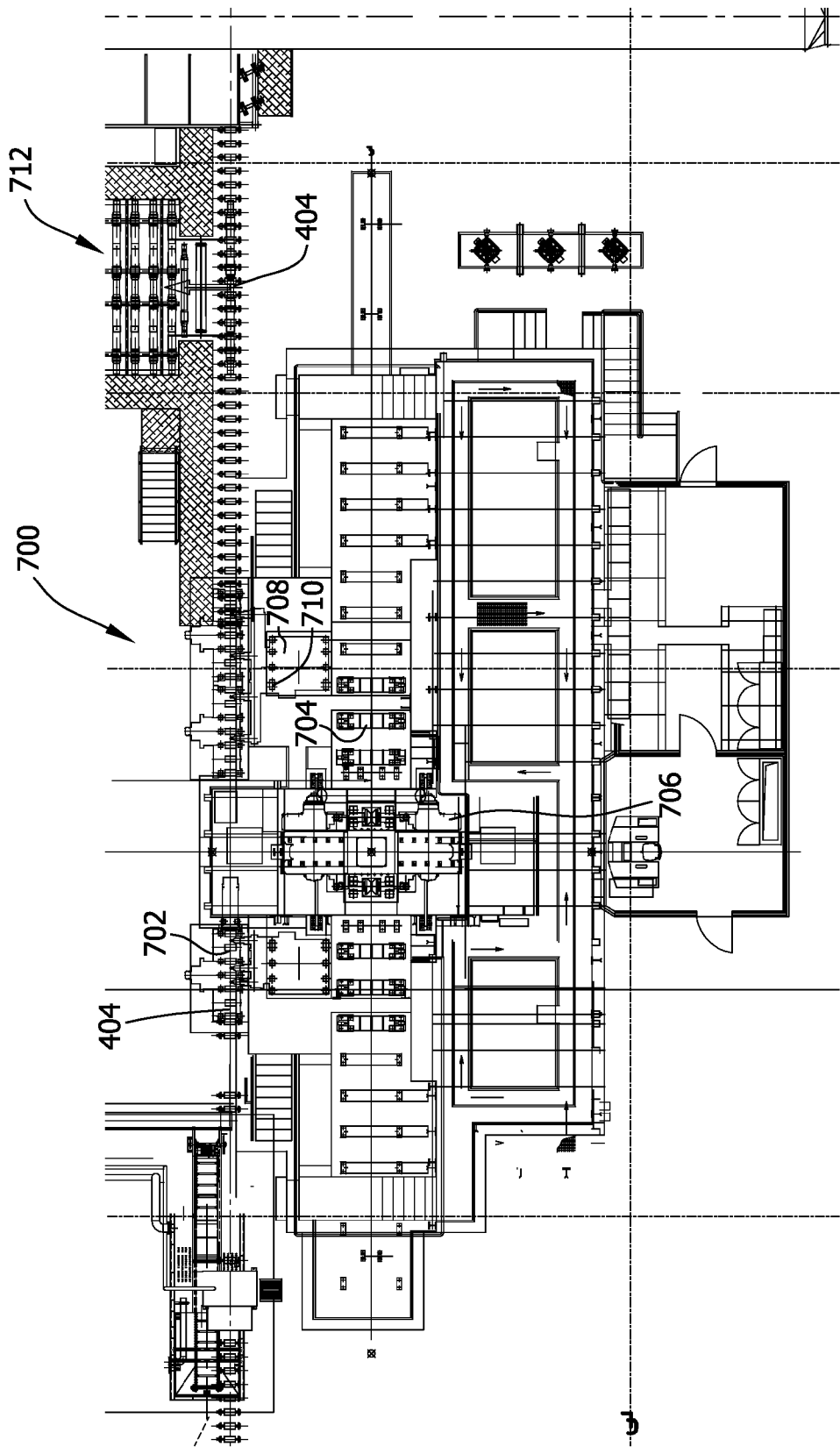
FIG. 7 is a top view of an exemplary forging system that may be used with the system shown in FIG. 3.

FIG. 7 is a top view of an exemplary forging system 700 that may be used with system 200 (shown in FIG. 3) as forging system 212 (shown in FIG. 3). Forging system 700 is a Radial Forging Machine, Type RF 35, manufactured by GFM. Alternatively, forging system 700 is any forging system capable of forming an axle assembly, such as double axle 801 (shown in FIG. 8), from a billet 402 (shown in FIG. 4). Alternatively, the forged axle assembly is any suitable type of axle assembly, such as a single axle. In the exemplary embodiment, a series of arms 702 removes a billet 402 from conveyor 404 and moves billet 402 into and out of forging system 700. Once billet 402 is in forging system 700, forging system 700 automatically forms a double axle 801, to near net shape, from a billet 402 according to the type of finished axle as indicated by a tracking identifier assigned to billet 402. In the exemplary embodiment, forging system 700 is controlled by a CNC control system to hot build double axle 801 by hammering billet 402 with a plurality of different rams 704, such as four different rams, that are arranged within forging system 700. Forging system 700 includes at least a pair of chuck heads 706 to guide a product through forging system 700. Double axles 801 are discharged from forging system 700 for transport to a subsequent post-forge cooling system, such as post-forge cooling system 800 (shown in FIG. 8), by conveyor 404.

Forging system 700 includes therein an automated axle inspection system 708 that determines whether a double axle 801 satisfies pre-determined conditions. More specifically, inspection system 708 includes optical cameras 710 programmed to measure dimensions of double axle 801 and compare measured values with determined dimension values based on the type of axle indicated by the assigned tracking identifier for double axle 801. If double axle 801 does not satisfy the conditions, double axle 801 is placed within a rejection area 712. Rejected double axles 801 are allowed to cool and are removed from system 200. If double axle 801 does satisfy the conditions, double axle 801 is placed on conveyor 404 to the subsequent post-forging cooling system. Alternatively, axle inspection system 708 may include programs for performing any suitable processes that enable system 200 to function as described herein.

Figure 8:
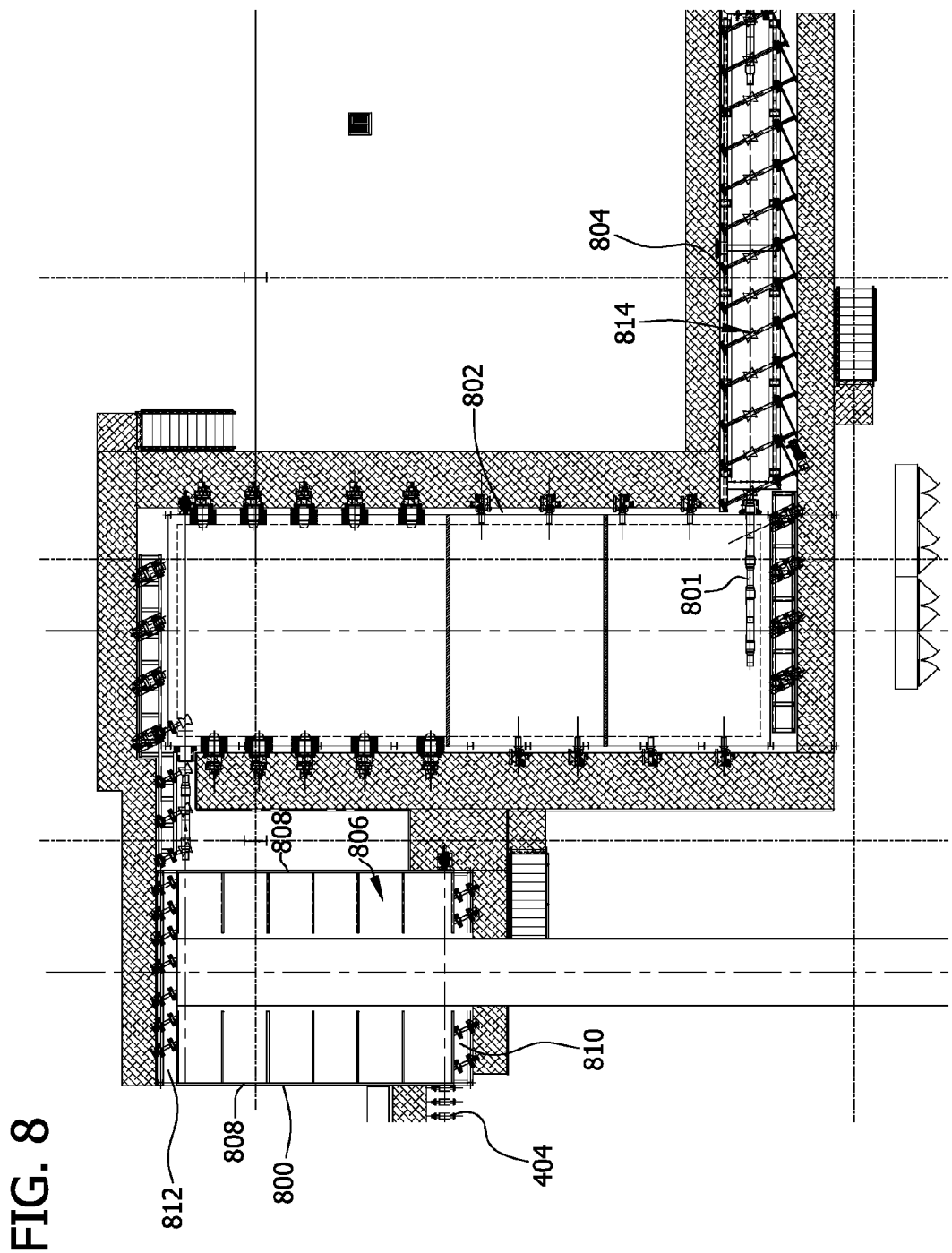
FIG. 8 is a top view of an exemplary post-forging cooling system, normalizing system, and quenching system that may be used with the system shown in FIG. 3.

FIG. 8 is a top view of an exemplary post-forging (PF) cooling system 800, normalizing system 802, and quenching system 804 that may be used with system 200 (shown in FIG. 3) as PF cooling system 214 (shown in FIG. 3), normalizing system 216 (shown in FIG. 3), and quenching system 218 (shown in FIG. 3). In the exemplary embodiment, PF cooling system 800 is configured to cool double axles 801 therein. More specifically, PF cooling system 800 includes cooling tables 806 and overhead hoods therein. In the exemplary embodiment, cooling tables 806 are continuous walking beam tables. The hoods draw air from cooling tables 806 and discharge the air to ambient. As such, double axles 801 are passively cooled within PF cooling system 800. Further, tables 806 within PF cooling system 800 are movable along conveyors 808 to convey double axles 801 from an entering conveyor 810 to an exiting conveyor 812 that transports double axles 801 to normalizing system 802 as double axles 801 cool. In the exemplary embodiment, conveyors 810 and 812 are powered roller conveyor tables.

Normalizing system 802 is configured to perform a single normalizing process to heat treat each double axle 801. More specifically, normalizing system 802 heat treats double axles 801 to achieve predetermined mechanical properties, such as strength and ductility. When vacuum degassed steel is used to form double axles 801, only a single normalizing process, as opposed to the known double normalizing process, is performed to achieve the predetermined properties. Further, axles 801 are continuously moved though normalizing system 802 by, for example, continuous walking beam tables. In the exemplary embodiment, normalizing system 802 is a normalizing furnace manufactured by Can-Eng, however, it will be understood that any suitable normalizing system that is capable of performing a single normalizing process may be used as normalizing system 802. Axle 801 is conveyed by, for example, a powered roller conveyor table to quenching system 804.

Quenching system 804 is configured to optionally quench double axles 801 after being normalized, depending on the type of axle and/or other conditions requested by a buyer. More specifically, quenching system 804 is configured to lower a temperature of double axles 801 from a temperature of about 1600° F. to about 1800° F. to a temperature of about 200° F. to about 600° F. In the exemplary embodiment, quenching system 804 includes a powered roller conveyor table 814 supplied by Can-Eng. Alternatively, quenching system 804 includes any suitable components and/or devices that enable quenching system 804 to function as described herein. When quenching is not required, double axles 801 are conveyed through quenching system 804 by power roller conveyor table 814 to a subsequent post-normalizing cooling system, such as post-normalizing cooling system 900 (shown in FIG. 9).

Figure 9:
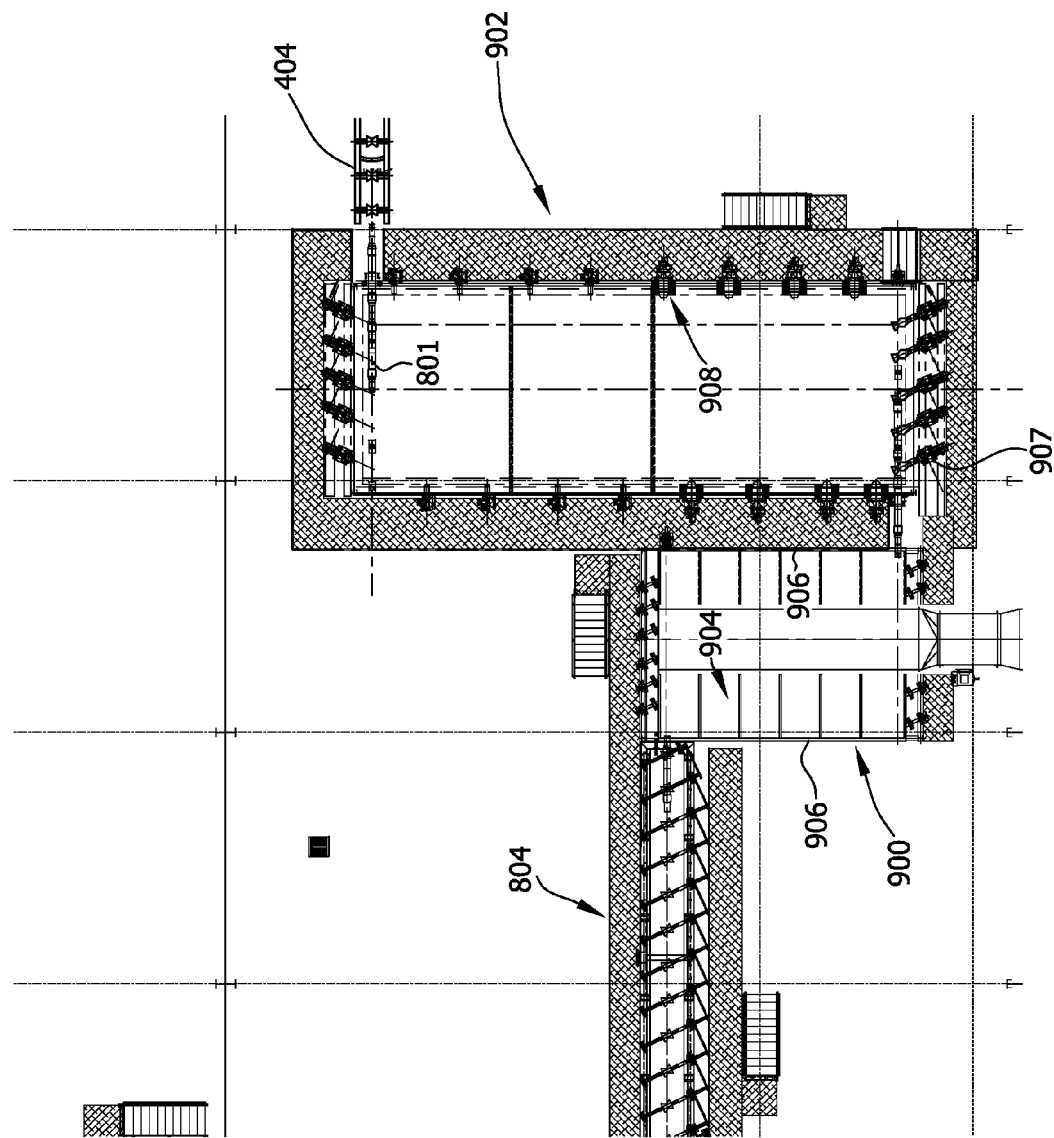
FIG. 9 is a top view of quenching system shown in FIG. 8 and an exemplary post-normalizing cooling system, and tempering system that may be used with the system shown in FIG. 3.

FIG. 9 is a top view of quenching system 804 and an exemplary post-normalizing (PN) cooling system 900 and tempering system 902 that may be used with system 200 (shown in FIG. 3) as PN cooling system 220 (shown in FIG. 3) and tempering system 222 (shown in FIG. 3).

PN cooling system 900 is configured to cool double axles 801 therein. More specifically, PN cooling system 900 includes cooling tables 904 and overhead hoods therein. In the exemplary embodiment, cooling tables 904 are continuous walking beam tables. The hoods draw air from cooling tables 904 and discharge the air to ambient. As such, double axles 801 are passively cooled within PN cooling system 900. Further, tables 904 within PN cooling system 900 are movable along a conveyor 906 to convey double axles 801 from quenching system 804 to tempering system 902 as double axles 801 cool. PN cooling system 900 is used in system 200 to replace the known method of pile-cooling axles under dirt. As such, PN system 900 facilitates reducing cooling time after normalization, as compared to the pile-cooling method. A conveyor 907, such as a powered roller conveyor table, is located between PN cooling system 900 and tempering system 902 to transfer axle 801 from PN cooling system 900 to tempering system 902.

Tempering system 902 is configured to transform brittle martensite within double axles 801 into bainite or a combination of ferrite and cementite by heating double axles 801 to about 1000° F. to about 1350° F. In the exemplary embodiment, tempering system 902 is a tempering furnace manufactured by Can-Eng that includes a continuous walking beam table 908 therein. Alternatively, tempering system 902 is any suitable tempering system that enables system 200 to function as described herein. In the exemplary embodiment, conveyor 404 is positioned at end of tempering system 902 to remove double axles 801 therefrom.

Figure 10:
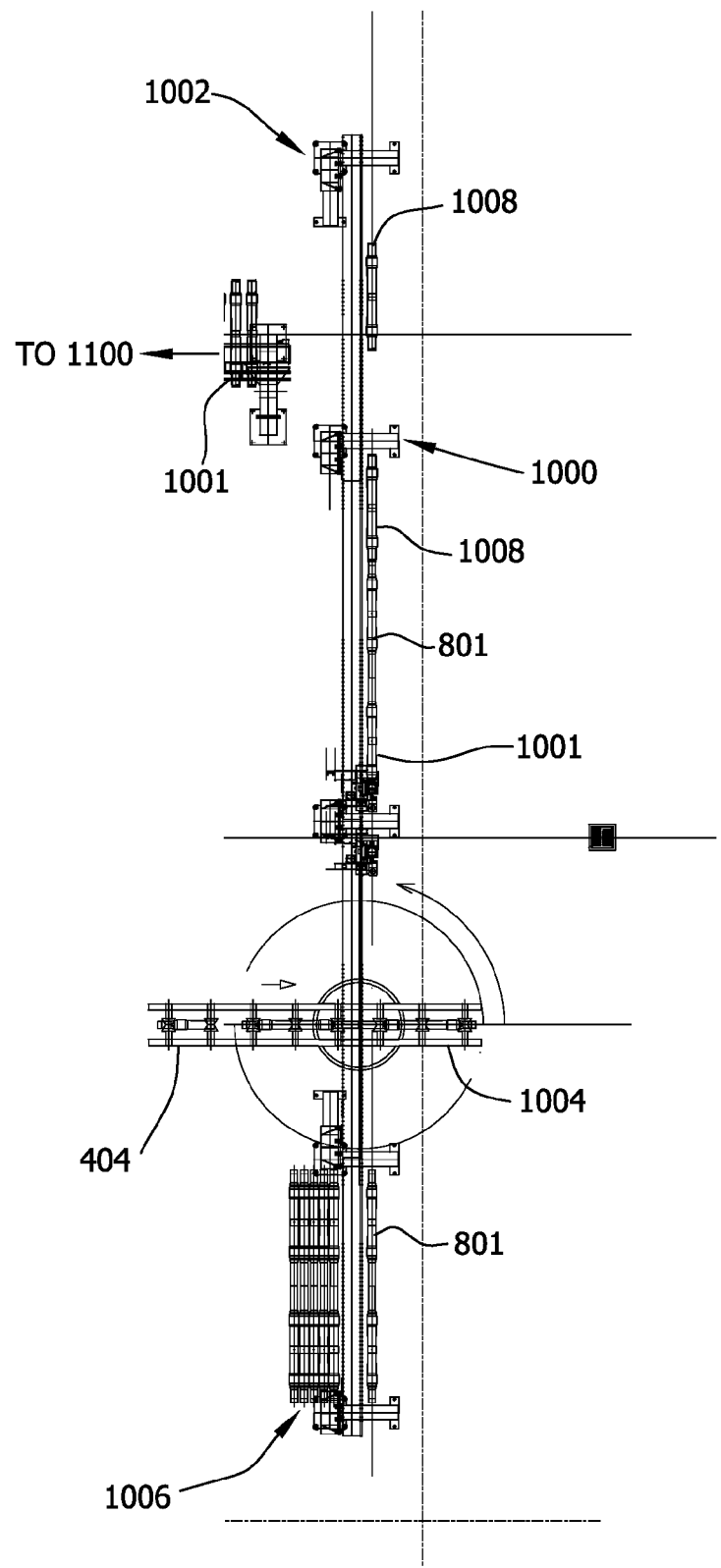
FIG. 10 is a top view of an exemplary gantry system, axle separation system, and straightening system that may be used with the system shown in FIG. 3.

FIG. 10 is a top view of conveyor 404, an exemplary gantry 1001, an exemplary axle separation system 1000, and an exemplary straightening system 1002 that may be used with system 200 (shown in FIG. 3) as gantry 293 (shown in FIG. 3), separation system 224 (shown in FIG. 3) and straightening system 226 (shown in FIG. 3). Conveyor 404 includes a roundabout 1004 and a buffer 1006 positioned after a tempering system, such as tempering system 902. Roundabout 1004 automatically directs double axles 801 to machining side 254 (shown in FIG. 3) or to buffer 1006 according to programming within roundabout 1004. Axles 801 within buffer 1006 are stored until further processing and/or rejection. Roundabout 1004 rotates and lowers double axle 801 to gantry 1001, which transports double axle 801 to a separation system 1000 on machining side 254. Axle separation system 1000 is configured to separate a double axle 801 into two single axles 1008.

More specifically, axle separation system 1000 cuts through double axle 801 at joined ends to form single axles 1008. For example, axle separation system 1000 forms four cuts in double axle 801 such that two cuts are near the center of double axle 801 and one cut is at each end of double axle 801 to achieve a final length of each single axle 1008 based on instructions from a control system, such as control system 1500 (shown in FIG. 15), according to an assigned tracking identifier for the single axles 1008. In the exemplary embodiment, axle separation system 1000 is a rotary saw manufactured by AME, however, axle separation system 1000 may be any suitable system, device, and/or unit for separating double axle 801 into single axles 1008 as described herein.

Straightening system 1002 positioned after axle separation system 1000 is configured to check the straightness of each single axle 1008 by rotating single axle 1008 to check for high and low portions of single axle 1008. If an axle 1008 does not satisfy straightness requirements, straightening system 1002 automatically corrects the straightness of axle 1008 by indexing axle 1008 to a high portion and pressing the high portion. More specifically, straightening system 1002 includes a 400-ton gap frame press manufactured by Williams White. If axle 1008 is not corrected within a predetermined number of attempts, axle 1008 is rejected. Rejected single axles 1008 are allowed to cool and are removed from system 200.

Figure 11:
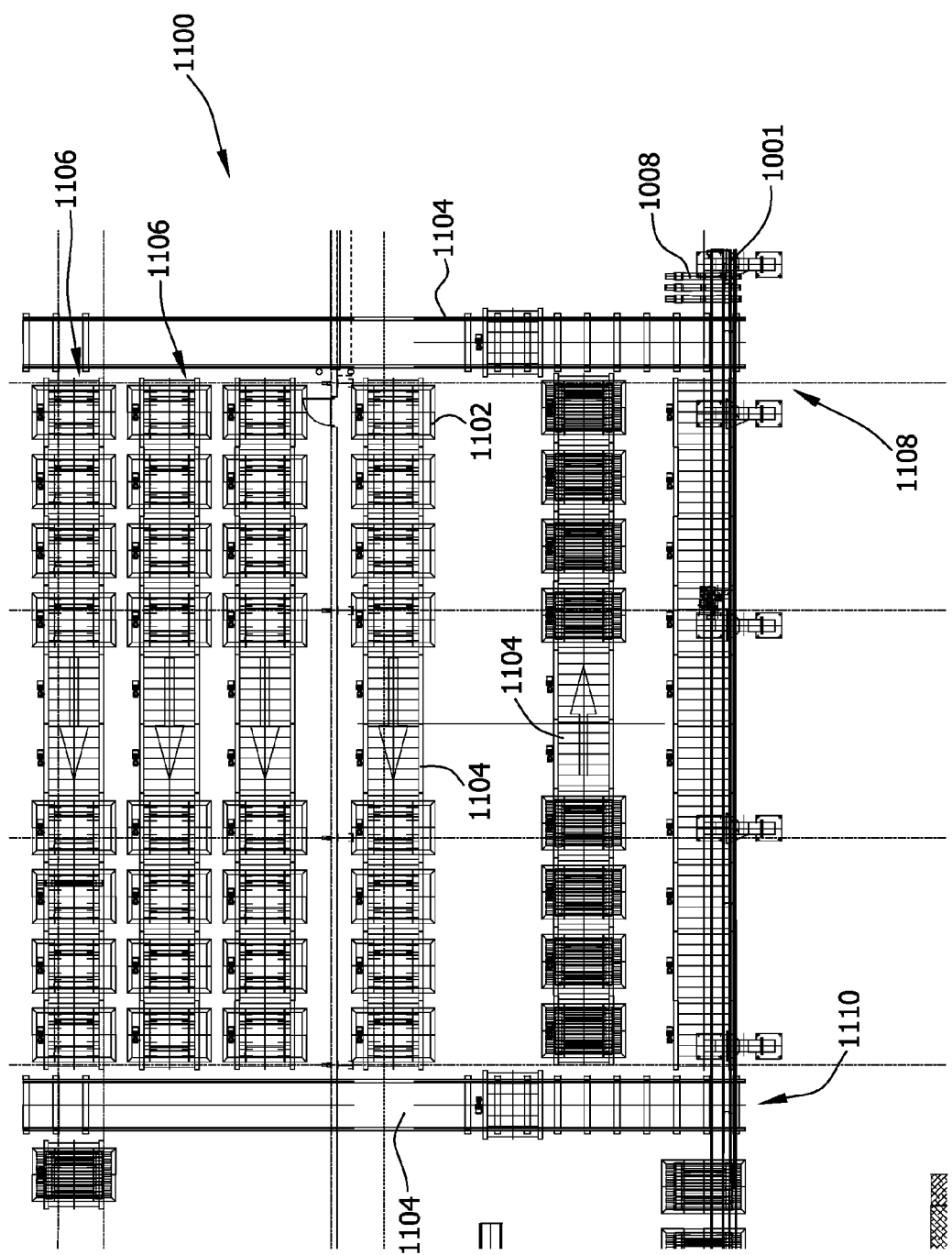
FIG. 11 is a top view of an exemplary cooling area that may be used with the system shown in FIG. 3.

FIG. 11 is a top view of an exemplary cooling area 1100 that may be used with system 200 (shown in FIG. 3) as cooling area 228 (shown in FIG. 3). Cooling area 1100 includes a plurality of pallets 1102 that are moved slowly throughout cooling area 1100 to cool single axles 1008 thereon. More specifically, cooling area 1100 is configured to cool axles 1008 from about 1200° F. to about 200° F. in about six to about ten hours while avoiding inducing warping and/or brittleness in axles 1008. In the exemplary embodiment, pallets 1102 are moved by a conveying system 1104 manufactured by Güdel, and cooling area 1100 includes thirty-six pallets 1102 that can each hold seven axles 1008. More specifically, cooling area 1100 includes a plurality of rows 1106 of pallets 1102 that move each pallet 1102 from a hot side 1108 to a cool side 1110 of cooling area 1100 along each row 1106. As axles 1008 are moved along each row 1106, axles 1008 are passively cooled using, for example, hoods as described herein. At cool side 1110, single axles 1008 are removed from pallets 1102 for further processing within system 200. In an alternative embodiment, cooling area 1100 includes any suitable number or configuration of pallets 1102 and/or any suitable means for moving pallets 1102 that enable system 200 to function as described herein. Alternatively, cooling area 1100 includes any suitable means for achieving the cooling of axles, as described herein.

Figure 12:
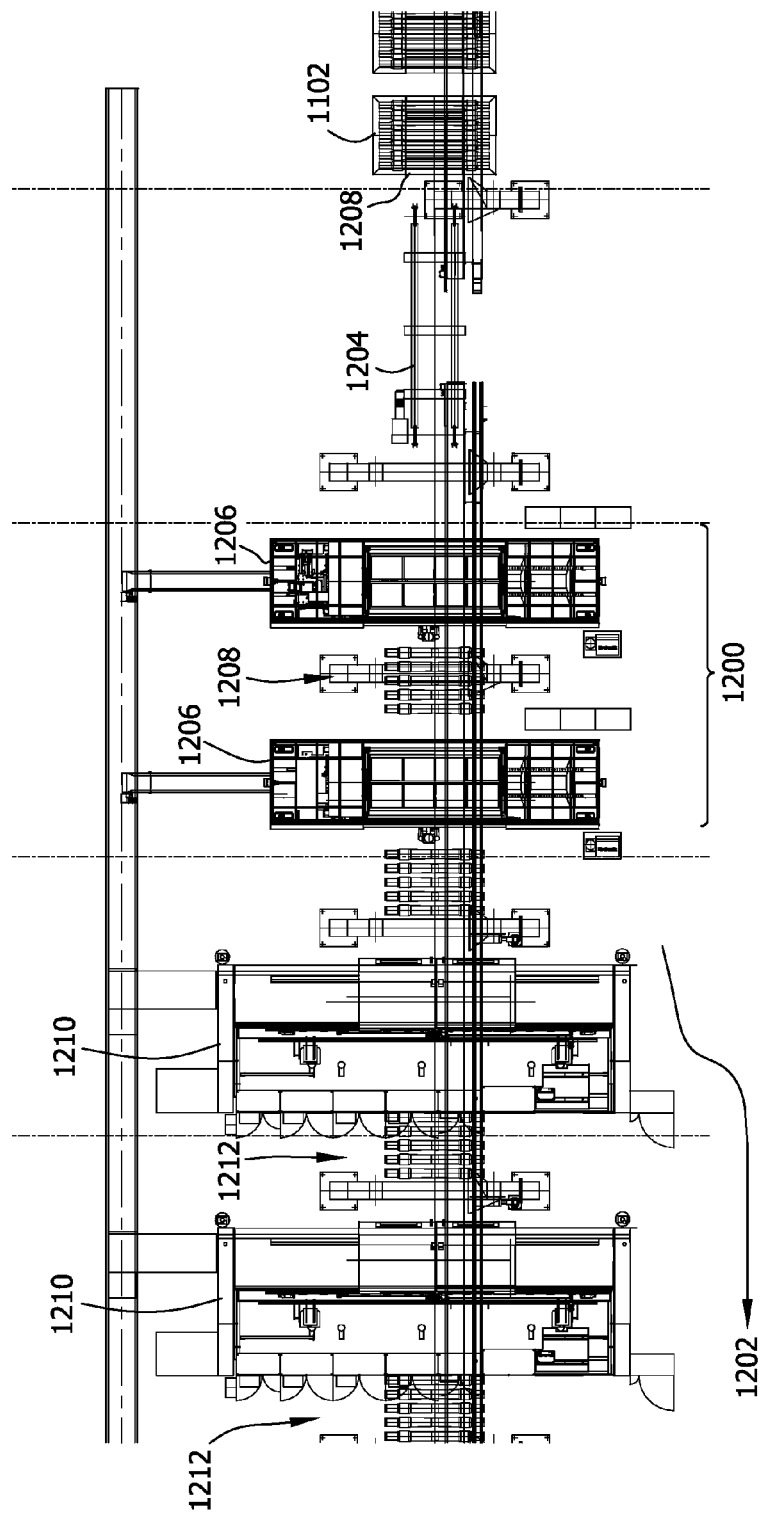
FIG. 12 is a top view of an exemplary end facing system and machining system that may be used with the system shown in FIG. 3.

FIG. 12 is a top view of an exemplary end facing system 1200 and machining system 1202 that may be used with system 200 (shown in FIG. 3) as end facing system 230 (shown in FIG. 3) and machining system 232 (shown in FIG. 3). In the exemplary embodiment, an overhead line gantry 1204, such as Line Gantry FP-7HD manufactured by Güdel, removes an axle 1008 from cooling area 1100 for machining. More specifically, line gantry 1204 extends between cooling area 1100 and an axle marking system 1302 (shown in FIG. 13).

End facing system 1200 includes two end facing machines 1206, with a buffer 1208 therebetween, for facing ends of axle 1008 by removing material from each end of axle 1008 and drilling a center hole in each end of axle 1008. In the exemplary embodiment, end facing system 1200 includes two end facing, three-axis, CNC controlled machines 1206 manufactured by SEMA, for centering and end facing. In an alternative embodiment, end facing system 1200 includes any suitable systems, devices, and/or machines that enable system 200 to function as described herein. In the exemplary embodiment, line gantry 1204 moves axle 1008 from cooling area 1100, through end facing system 1200, and to machining system 1202.

Machining system 1202 is located after end facing system 1200 and is configured to remove a portion of material from a wheel seat and a bearing seat of each axle 1008 and to cut a barrel of each axle 1008. In the exemplary embodiment, machining system 1202 includes up to four lathes 1210 manufactured by N-S, with a buffer 1212 between each lathe 1210. More specifically, machining system 1202 includes four Nile N40 roughing lathes 1210 that are four-axis CNC lathes configured to leave approximately ⅛ of an inch to approximately ¼ of an inch of excess material for finishing on a wheel seat and a bearing seat and to cut the barrel of axle 1008. In the exemplary embodiment, line gantry 1204 conveys axles 1008 through the series of lathes 1210. More specifically, between individual machining operations, axles 1008 are stored on axle buffers 1212 and are machined using a "first in-first out" approach. Alternatively, machining system 1202 includes any suitable systems, devices, and/or machines that enable system 200 to function as described herein. In the exemplary embodiment, line gantry 1204 removes rough-machined axles 1306 (shown in FIG. 13) from machining system 1202 and into inspection system 1300.

Figure 13:
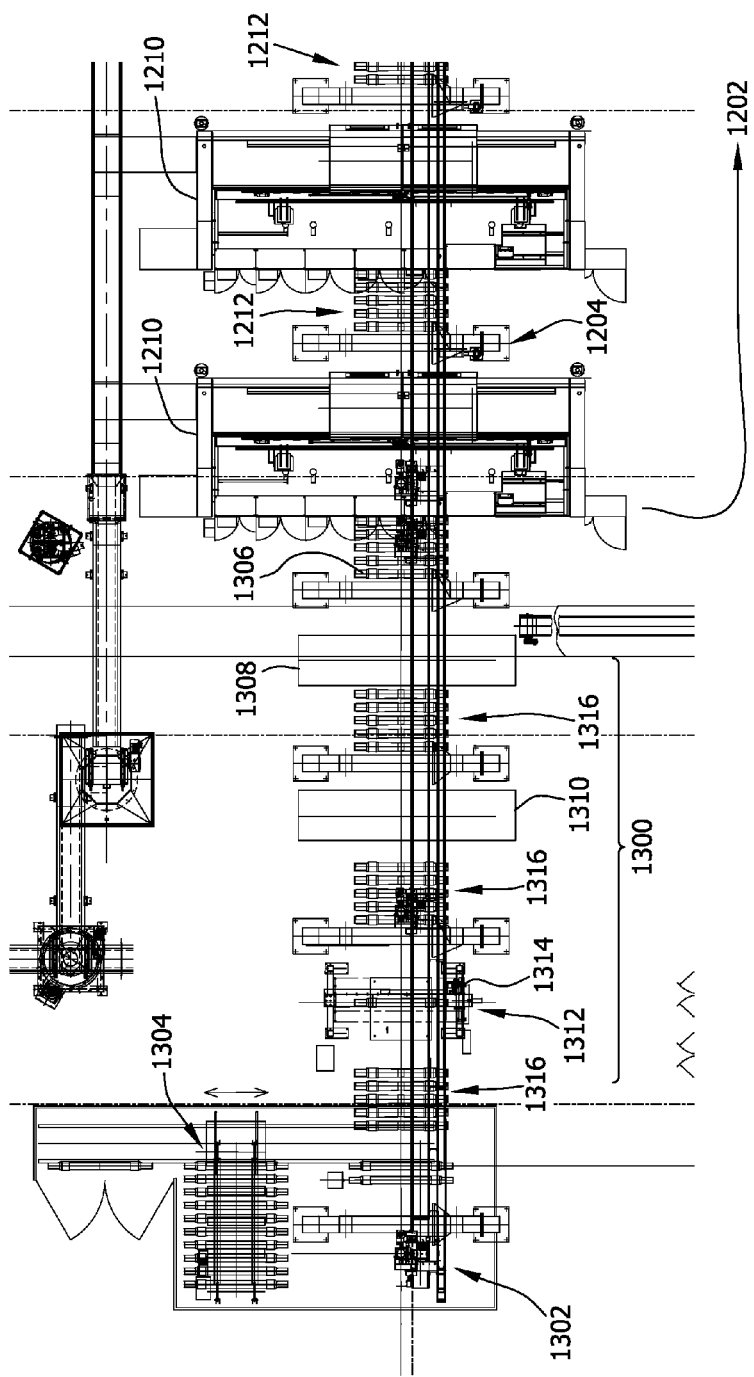
FIG. 13 is a top view of the machining system shown in FIG. 12 and an exemplary inspection system, axle marking system, and washing system that may be used with the system shown in FIG. 3.

FIG. 13 is a top view of machining system 1202 and an exemplary inspection system 1300, an exemplary axle marking system 1302, and an exemplary washing system 1304 that may be used with system 200 (shown in FIG. 3) as inspection system 234 (shown in FIG. 3), axle marking system 236 (shown in FIG. 3), and washing system 238 (shown in FIG. 3). Line gantry 1204 transports rough axles 1306 through inspection system 1300 and into axle marking system 1302.

Inspection system 1300 includes a plurality of inspection sub-systems, such as an ultrasonic sub-system, a magnetic particle testing sub-system, an automated visual sub-system, and/or a laser measuring sub-system, for inspecting each rough axle 1306. In the exemplary embodiment, inspection system 1300 includes an ultrasound testing apparatus 1308 manufactured by GE, a magnaflux technology apparatus 1310 manufactured by K+D, an APIS visual inspection apparatus 1312, and a laser measurement device 1314 manufactured by N-S within visual inspection apparatus 1312, each having a buffer 1316 therebetween. Ultrasound apparatus 1308 is a full immersion apparatus that detects voids and/or discontinuities in an axle 1306. Magnaflux technology apparatus 1310 detects scratches and/or cracks on a surface of axle 1306, and APIS visual inspection apparatus 1312 includes a camera to detect deep gouges and ensure that each axle 1306 is manually viewed. Laser measurement apparatus 1314 measures a length of axle 1306, a diameter of barrel of axle 1306, and diameters of the wheel and bearing seats of axle 1306. Alternatively, inspection system 1300 uses any suitable technology for inspecting rough axles 1306 to determine whether an axle 1306 satisfies predetermined conditions. In the exemplary embodiment, inspection system 1300 automatically determines whether an axle 1306 satisfies the predetermined conditions, and automatically rejects rough axles 1306 that do not satisfy the conditions.

Line gantry 1204 extends between inspection system 1300 and axle marking system 1302. Axle marking system 1302 is configured to mark a final identifier onto each rough axle 1306. The final identifier is marked using any suitable process than enables the tracking identifier to withstand use of axle 1306 with a railcar, such as railcar 10 (shown in FIG. 1). The final identifier may be a barcode, symbol, and/or any other suitable identifier marked on to rough axle 1306 at any suitable location to be read by a subsequent identifier reading device during shipping, finishing, and/or use of axle 1306 to provide information related to each axle 1306. In the exemplary embodiment, the final identifier is a barcode that is adhered to an end face or barrel of rough axle 1306. The end face is also stamped by a needle stamping station manufactured by Borries, and the final identifier is read using a CCD camera and a laser line. The final identifier includes information from billet barcode and the tracking identifier used during manufacturing such that the final identifier includes, for example, axle manufacturer information, heat code, heat lot, and/or steel supplier information. Alternatively, the final identifier is any suitable identifier marked by any suitable marking device to be read by any suitable identifier reading device. Washing system 1304 follows axle marking system 1302 and is configured to wash each rough axle 1306 and apply a rust inhibitive spray to each axle 1306.

Figure 14:
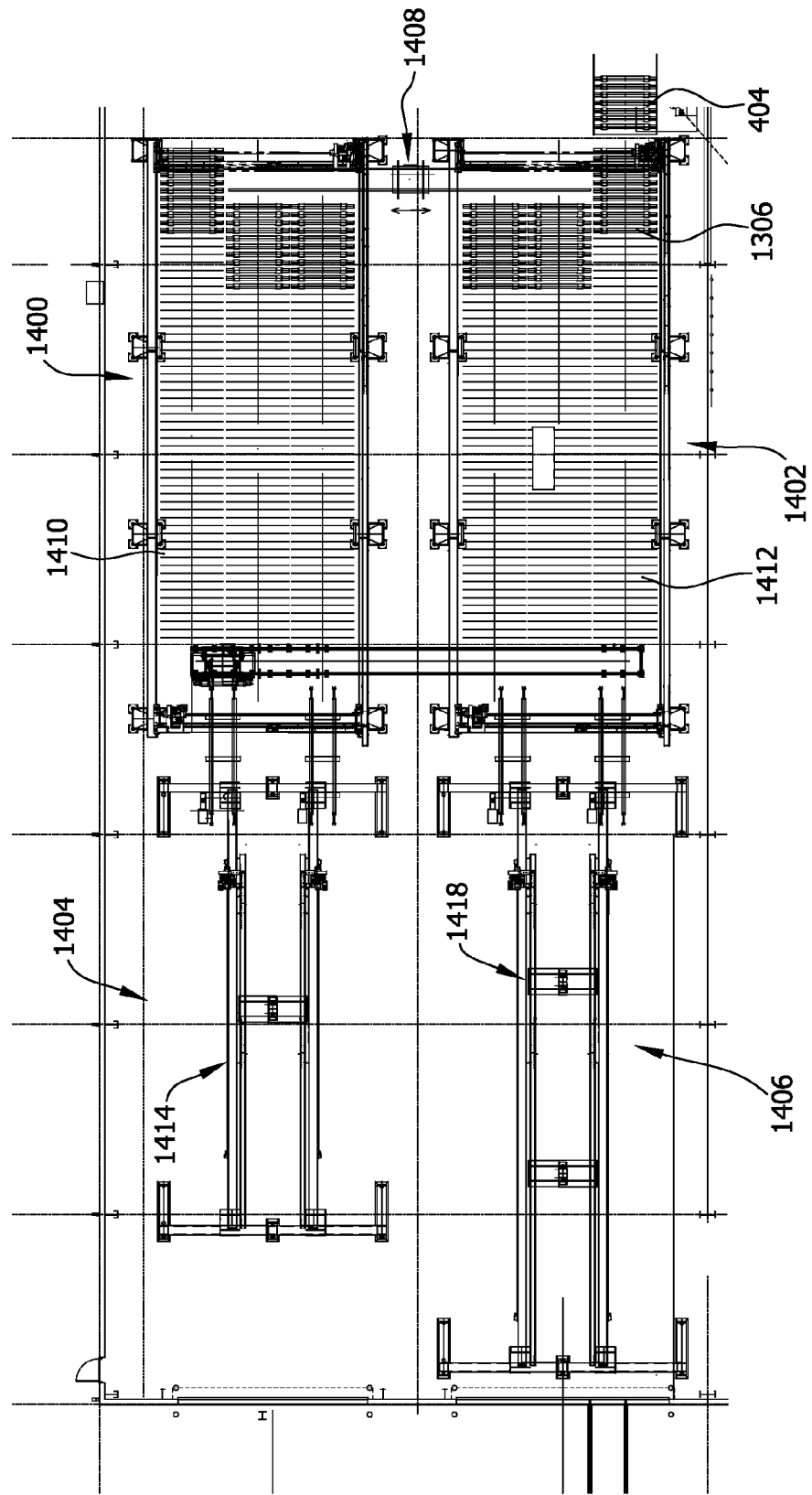
FIG. 14 is a top view of an exemplary truck storage and loading area, train storage and loading area, trucking shipping area, and train shipping area that may be used with the system shown in FIG. 3.

FIG. 14 is a top view of an exemplary truck storage and loading area 1400, train storage and loading area 1402, trucking shipping area 1404, and train shipping area 1406 that may be used with system 200 (shown in FIG. 3) as truck storage and loading area 240 (shown in FIG. 3), train storage and loading area 242 (shown in FIG. 3), trucking shipping area 244 (shown in FIG. 3), and train shipping area 246 (shown in FIG. 3).

Conveyor 404 extends from a washing system, such as washing system 1304 (shown in FIG. 13), to train storage and loading area 1402. A gantry 1408 is configured to automatically receive rough axles 1306 from conveyor 404 and place axles 1306 within truck storage and loading area 1400 or train storage and loading area 1402. Further, gantry 1408 is configured to automatically move axles 1306 between truck storage and loading area 1400 and train storage and loading area 1402 depending on shipping requirements and the tracking identifier assigned to each axle 1306. In the exemplary embodiment, gantry 1408 is manufactured by Güdel and includes multiple arms that can pick and place an axle 1306. Truck storage and loading area 1400 and train storage and loading area 1402 are each configured to store rough axles 1306 therein before axles 1306 are shipped. More specifically, axles 1306 are stored in a truck buffer 1410 and a train buffer 1412, such as buffers manufactured by Güdel, before shipping. Buffers 1410 and/or 1412 allow three-shift production of axles 1306 with shipping during normal business hours. Gantry 1408 is movable between buffers 1410 and 1412 for transporting axles 1306 to or from each buffer 1410 and/or 1412.

Truck output conveyor 310 (shown in FIG. 3) is a truck output gantry 1414 that is, for example, an automated gantry manufactured by Güdel, and that extends between truck storage and loading area 1400 and truck shipping area 1404. Alternatively, output gantry 1414 is any suitable crane, conveyor, and/or automated transport means that enables system 200 to function as described herein. In the exemplary embodiment, truck output gantry 1414 is configured to transfer axles 1306 from storage and loading area 1400 to a truck within truck shipping area 1404. More specifically, truck output gantry 1414 is configured to load axles 1306 onto the truck in either a parallel orientation or a perpendicular orientation. In one embodiment, truck output gantry 1414 is programmed to automatically load forty axles per truck. In the exemplary embodiment, output gantry 1414 automatically locates the four corners of a truck trailer, and once a first axle is positioned and chucked on the truck trailer, output gantry 1414 automatically loads the remaining axles of the shipment on the truck trailer.

Train output conveyor 312 (shown in FIG. 3) is a train output gantry 1418 that is, for example, an automated gantry manufactured by Güdel, and that extends between train storage and loading area 1402 and train shipping area 1406. Alternatively, output gantry 1418 is any suitable crane, conveyor, and/or automated transport means that enables system 200 to function as described herein. In the exemplary embodiment, train output gantry 1418 is configured to transfer axles 1306 from storage and loading area 1402 to a train car within train shipping area 1406. More specifically, train output gantry 1418 is configured to load axles 1306 onto the train in either a parallel orientation or a perpendicular orientation. In one embodiment, train output gantry 1418 is programmed to automatically load eighty axles per train. In the exemplary embodiment, output gantry 1418 automatically locates the four corners of a train car, and once a first axle is positioned and chucked on the train car, output gantry 1418 automatically loads the remaining axles of the shipment on the train car. Train shipping area 1406 may also be used to load a truck for shipping axles. Because system 200 includes separate loading areas 1404 and 1402 and separate output gantries 1414 and 1418 for truck and train shipments, a truck and a railcar, or two truck shipments, can be loaded simultaneously by output gantries 1414 and 1418 to facilitate increasing shipping capacity.

Figure 15:
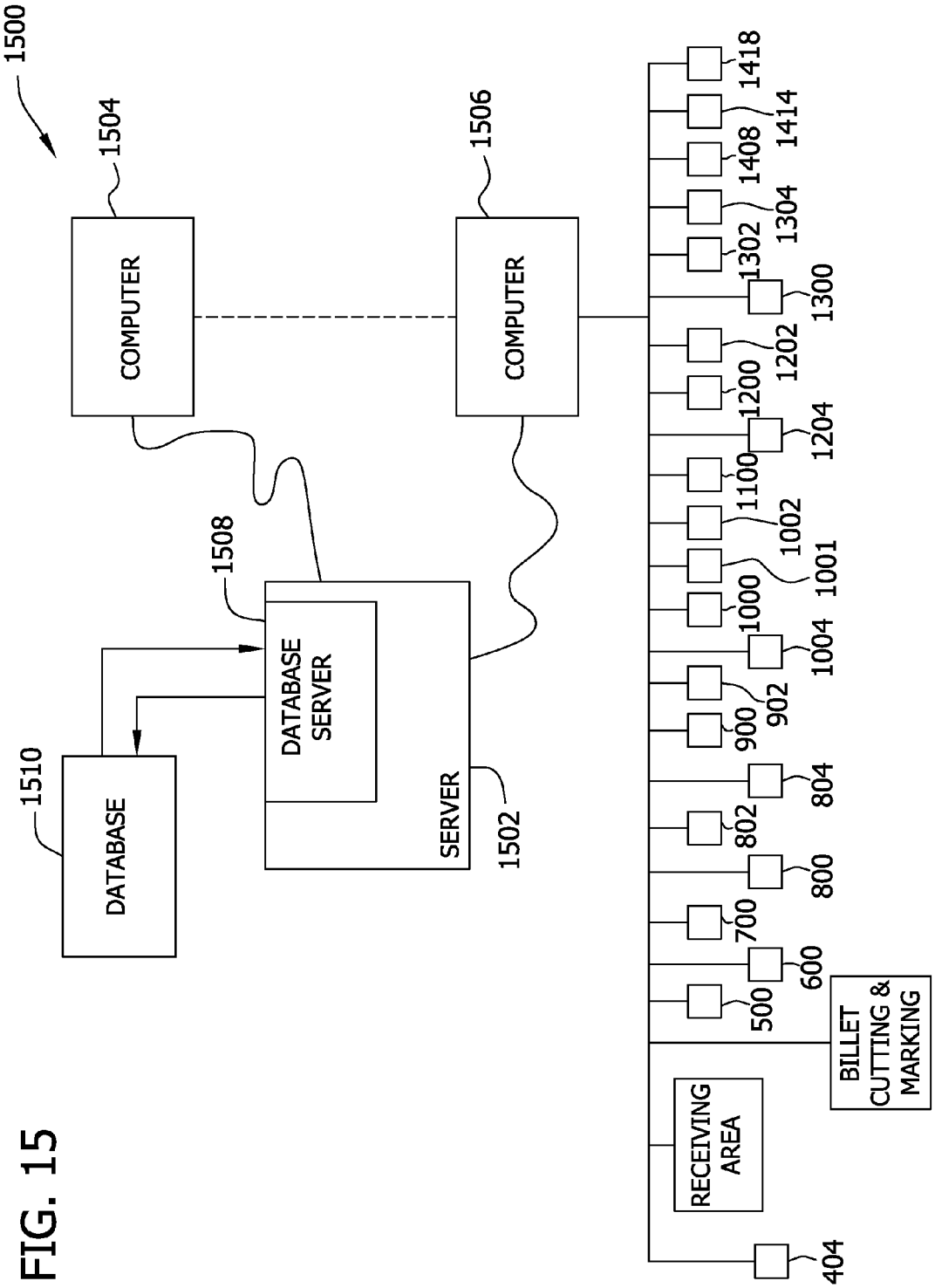
FIG. 15 is a block diagram of an exemplary control system that may be used with the system shown in FIG. 3.

FIG. 15 is a block diagram of an exemplary control system 1500 that may be used with system 200 (shown in FIG. 3) as control system 248 (shown in FIG. 3). Control system 1500 includes a server system 1502, and a plurality of client subsystems, also referred to as client systems 1504 and 1506, connected to server system 1502. In one embodiment, client systems 1504 and 1506 are computers including a web browser, such that server system 1502 is accessible to client systems 1504 and 1506 using the Internet. Client systems 1504 and 1506 are interconnected to the Internet through many interfaces including a network, such as a local area network (LAN) or a wide area network (WAN), dial-in-connections, cable modems and special high-speed ISDN lines. Client systems 1504 and 1506 could be any device capable of interconnecting to the Internet including a web-based phone, personal digital assistant (PDA), or other web-based connectable equipment. A database server 1508 is connected to a database 1510 containing information on a variety of matters, for example, design specifications for a plurality of axle types, information related to the virtual tracking identifier, and/or information related to the final identifier. In one embodiment, centralized database 1510 is stored on server system 1502 and can be accessed by potential users at one of client systems 1504 and 1506 by logging onto server system 1502 through one of client systems 1504 or 1506. In an alternative embodiment, database 1510 is stored remotely from server system 1502 and may be non-centralized.

At least one client system 1506 is connected to conveyor 404, the receiving area, such as receiving area 202 (shown in FIG. 3), inbound billet handling system 400, a billet cutting and marking system, such as billet cutting and marking system 206 (shown in FIG. 3), furnace 500, descaler 600, forging system 700, PF cooling system 800, normalizing system 802, quenching system 804, PN cooling system 900, tempering system 902, roundabout 1004, gantry 1001, axle separation system 1000, straightening system 1002, cooling area 1100, line gantry 1204, end facing system 1200, machining system 1202, inspection system 1300, axle marking system 1302, washing system 1304, gantry 1408, truck output gantry 1414, train output gantry 1418 for receiving information from and/or transmitting instructions to the above-listed components of system 200, as described herein. More specifically, control system 1500 includes programming to perform method 100 (shown in FIG. 2) using system 200 by communicating with and/or controlling the components of system 200. Further, control system 1500 uses information related to the virtual tracking identifier to track billet 402, and axles formed from billet 402, such as axles 801, 1008, and/or 1306 during method 100 and/or through system 200.

Figure 16:
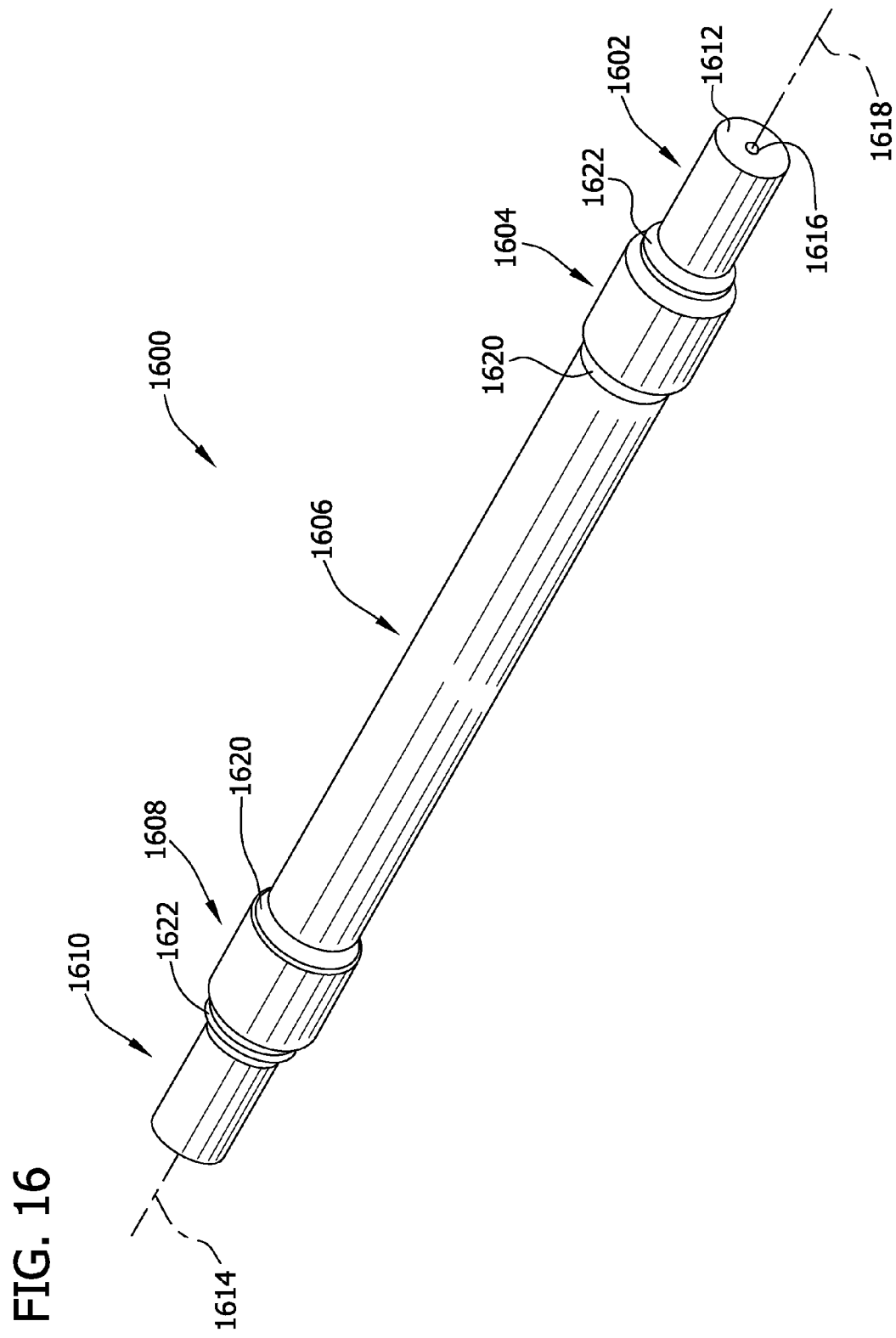
FIG. 16 is perspective view an exemplary axle formed using the method shown in FIG. 2 and the system shown in FIG. 3.

FIG. 16 is a perspective view of an exemplary axle 1600 formed using method 100 (shown in FIG. 2) and system 200 (shown in FIG. 3). Axle 1600 includes a first wheel seat 1602, a first bearing seat 1604, a barrel 1606, a second bearing seat 1608, and a second wheel seat 1610 extending in series between a first end face 1612 and a second end face 1614. Each end face 1612 and 1614 includes a center hole 1616. Bearing seats 1604 and 1608 have a diameter that is larger than a diameter of wheel seats 1602 and 1610 and barrel 1606. Alternatively, other types of axles manufactured by using method 100 and/or system 200 may have other relationships between diameters and/or other dimensions. In the exemplary embodiment, seats 1602, 1604, 1608, and 1610 and barrel 1606 are substantially cylindrical along a longitudinal axis 1618. Fillets 1620 are formed between first bearing seat 1604 and barrel 1606 and between barrel 1606 and second bearing seat 1608. Steps 1622 are defined between first wheel seat 1602 and first bearing seat 1604 and between second bearing seat 1608 and second wheel seat 1610. Alternatively, axle 1600 may include transitions other than fillets 1620 and steps 1622 depending on the type of axle manufactured. In the exemplary embodiment, end faces 1612 and 1614 are substantially planar and substantially parallel to each other. Center holes 1616 are defined in each faces 1612 and 1614 where axis 1618 intersects end faces 1612 and 1614. End faces 1612 and 1614 and center holes 1616 are machined by, for example, end facing system 230 (shown in FIG. 3), and wheel seats 1602 and 1610, bearings seats 1604 and 1608, and barrel 1606 are machined by, for example, machining system 232 (shown in FIG. 3).

The above-described methods and systems for manufacturing an axle, such as an axle for a railcar, provide a continuous, automated method and system that facilitate increasing an axle output per day, as compared to known axle manufacturing systems that perform different manufacturing processes in different buildings. Increase in axle output is further facilitated by the above-described methods and systems by using continuous cool downs, rather than known cooling methods that remove the axles from the system for an extended period time before continuing the manufacturing processes. Furthermore, because the methods and systems described herein are fully automated, fewer employees are required to operate the systems and/or perform the methods such that the cost of manufacturing axles is facilitated to be decreased, as compared to manufacturing systems that are not fully automated and include manual operations. Moreover, the systems described herein are located within one building and is continuous therein because a solid wall and negative pressure on a forging side prevent heat and/or dust from migrating to a machining side, which requires cooling and cleanliness for machining processes performed therein.

Exemplary embodiments of methods and systems for manufacturing an axle are described above in detail. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods for manufacturing a railcar axle as described herein. Rather, the exemplary embodiment can be implemented and utilized in connection with many other forging and/or machining applications.

Although specific features of various embodiments of the methods and/or systems described herein may be shown in some drawings and not in others, this is for convenience only.

In accordance with the principles of the methods and/or systems described herein, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for manufacturing an axle using a continuous process, said method comprising:
   heating a billet at a heating station to a predetermined temperature;
   forging the heated billet at a forging station to form an axle;
   machining the axle at a machining station to form a machined axle; and
   automatically and continuously transporting a product to and from the heating station, the forging station, and the machining station using a product transport system, wherein the product includes the billet, the axle and the machined axle.

2. A method in accordance with claim 1, wherein automatically and continuously transporting a product to and from each station using a product transport system further comprises automatically transporting the product to and from each station using at least one of a conveyor, a robotic manipulator, and a crane.

3. A method in accordance with claim 1 further comprising controlling at least the heating station, the forging station, the machining station, and the product transport system using a control system.

4. A method in accordance with claim 1 further comprising receiving the billet at a beginning of the product transport system.

5. A method in accordance with claim 1 further comprising automatically cutting the billet to a predetermined size before heating the billet, wherein the predetermined size is based on a type of axle to be manufactured from the billet.

6. A method in accordance with claim 1 further comprising tracking the billet and any axles produced from the billet during the manufacturing process.

7. A method in accordance with claim 1 further comprising descaling the heated billet at a descaling station prior to forging the heated billet, wherein the descaling station uses a high-pressure water spray to descale the heated billet.

8. A method in accordance with claim 1 further comprising heat treating the axle at a heat treating station after the axle is forged at the forging station, wherein the heat treating station automatically alters a temperature of the axle to produce an axle having predetermined metallurgical properties.

9. A method in accordance with claim 8, wherein heat treating the billet further comprises:
   cooling the axle at a post-forging cooling station;
   normalizing the axle at a normalizing station;
   cooling the normalized axle at a post-normalizing cooling station; and
   tempering the axle at a tempering station, wherein the axle is continuously transported through the heat treating station by the product transport system.

10. A method in accordance with claim 8, wherein heat treating the billet further comprises quenching the axle before the axle is cooled at the post-normalizing cooling station.

11. A method in accordance with claim 1, wherein forging the heated billet at a forging station to form an axle further comprises forging the heated billet at the forging station to form a double axle, wherein the double axle includes a first axle having opposing ends and a second axle having opposing ends, wherein the first axle is coupled to the second axle at one end of each axle, said method further comprising separating the first axle from the second axle at an axle separation station by forming at least one cut in the double axle.

12. A method in accordance with claim 1 further comprising:
   verifying straightness of each axle before machining the axle; and
   if the straightness of the axle is not verified, correcting the straightness of the axle before machining the axle.

13. A method in accordance with claim 1 further comprising cooling the axle at a post-heat treating cooling station before machining the axle to form the machined axle, wherein the axle is continuously transported through the post-heat treating cooling station by the product transport system.

14. A method in accordance with claim 13, wherein cooling the axle at a post-heat treating cooling station further comprises cooling the axle at the post-heat treating cooling station from about 1200° F. to about 200° F. during a time period that is between approximately 6 hours and approximately 10 hours.

15. A method in accordance with claim 1, wherein machining the axles to form a machined axle further comprises:
   end facing the axle using at least one end facing machine;
   defining a center hole in each end face; and
   machining the axle using a series of lathes, wherein the axle is continuously transported through the least one end facing machine and the series of lathes by the product transport system.

16. A method in accordance with claim 1 further comprising inspecting the machined axle using an inspection station, wherein the machined axle is continuously transported through the inspection station.

17. A method in accordance with claim 16, wherein inspecting the machined axle further comprises at least one of:
   inspecting the machined axle using an ultrasonic testing apparatus;
   inspecting the machined axle using a magnetic particle testing apparatus; and
   inspecting the machined axle using an automated visual inspection apparatus.

18. A method in accordance with claim 16, wherein inspecting the machined axle further comprises measuring the machined axle using a laser measuring device.

19. A method in accordance with claim 1 further comprising marking the machined axle with an identification mark at an axle marking station, the identification mark providing information relating to the machined axle and the billet from which the machined axle was formed.

20. A method in accordance with claim 1 further comprising washing the machined axle to facilitate preventing rust from forming on the machined axle.

21. A method in accordance with claim 1 further comprising automatically loading a plurality of machined axles onto at least one of a truck and a train car according to a predetermined axle shipping allocation.

22. A method in accordance with claim 1, wherein the heating station and the forging station are located within a first chamber and the machining station is located within a second chamber, wherein said method further comprises creating a negative air pressure in the first chamber for preventing contaminants from migrating to the second chamber.

23. A method in accordance with claim 1, wherein said method for manufacturing an axle is performed within a single building.

24. A method in accordance with claim 1, wherein said method for manufacturing an axle is performed within less than 24 hours.

25. A method for manufacturing an axle using a continuous process, said method comprising:
- receiving a billet at a beginning end of a product transport system;
- entering information related to the billet into a control system at a receiving station, the information regarding at least one of a heat lot, a heat code, a chemical composition, and steel mill information;
- automatically cutting the billet at a cutting station to a predetermined size before heating the billet, wherein the predetermined size is based on a type of axle to be manufactured from the billet;
- tracking the billet and any axles produced from the billet during the manufacturing process;
- heating the billet at a heating station to a predetermined temperature;
- descaling the heated billet at a descaling station prior to forging the heated billet, wherein the descaling station uses a high-pressure water spray to descale the heated billet;
- forging the heated billet at a forging station to form an axle;
- heat treating the axle at a heat treating station after the axle is forged at the forging station, wherein the heat treating station automatically alters a temperature of the axle to produce an axle having predetermined metallurgical properties;
- cooling the axle at a post-heat treating cooling station before machining the axle to form the machined axle, wherein the axle is continuously transported through the post-heat treating cooling station by the product transport system;
- machining the axle at a machining station to form a machined axle;
- inspecting the machined axle using an inspection station;
- marking the machined axle with an identification mark at an axle marking station, the identification mark providing the entered information relating to the billet and information relating to the manufacturing process used to form the machined axle;
- washing the machined axle to facilitate preventing rust from forming on the machined axle;
- automatically loading a plurality of machined axles onto at least one of a truck and a train car according to a predetermined axle shipping allocation; and
- automatically and continuously transporting a product to and from each station using the product transport system that is controlled by the control system, wherein the product includes the billet, the axle and the machined axle.

26. A method in accordance with claim 25, wherein heat treating the billet further comprises:
- cooling the axle at a post-forging cooling station;
- normalizing the axle at a normalizing station;
- quenching the axle with water at a quenching station;
- cooling the normalized axle at a post-normalizing cooling station; and
- tempering the axle at a tempering station, wherein the axle is continuously transported through the heat treating station by the product transport system.

27. A method in accordance with claim 25 wherein forging the heated billet at a forging station to form an axle further comprises forging the heated billet at the forging station to form a double axle, wherein the double axle includes a first axle having opposing ends and a second axle having opposing ends, wherein the first axle is coupled to the second axle at one end of each axle, said method further comprising separating the first axle from the second axle at an axle separation station by forming at least one cut in the double axle.

28. A method in accordance with claim 25 further comprising:
- verifying straightness of each axle at a straightening station before machining the axle; and
- if the straightness of a single axle is not verified, correcting the straightness of the axle at the straightening station before machining the axle.

29. A method in accordance with claim 25, wherein machining the axles to form a machined axle further comprises:
- end facing the axle using at least one end facing machine;
- defining a center hole in each end face; and
- machining the axle using a series of lathes, wherein the axle is continuously transported through the least one end facing machine and the series of lathes by the product transport system.

30. A method in accordance with claim 25, wherein inspecting the machined axle further comprises at least one of:
- inspecting the machined axle using an ultrasonic testing apparatus;
- inspecting the machined axle using a magnetic particle testing apparatus;
- inspecting the machined axle using an automated visual inspection apparatus; and
- measuring the machined axle using a laser measuring device.

* * * * *